(12) United States Patent
Nickerson et al.

(10) Patent No.: US 10,773,984 B2
(45) Date of Patent: *Sep. 15, 2020

(54) MEDIA BED FOR WASTE STREAMS AND SYSTEMS EMPLOYING THE SAME

(71) Applicant: INTEGRATED AGRICULTURE SYSTEMS, INC., Harrisburg, PA (US)

(72) Inventors: Paul W. Nickerson, Mechanicsburg, PA (US); David K. Foster, Dillsburg, PA (US)

(73) Assignee: INTEGRATED AGRICULTURAL SYSTEMS, INC., Harrisburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,151

(22) Filed: Oct. 29, 2018

(65) Prior Publication Data
US 2019/0062186 A1 Feb. 28, 2019

Related U.S. Application Data

(63) Continuation of application No. 15/843,798, filed on Dec. 15, 2017, now Pat. No. 10,112,858.
(Continued)

(51) Int. Cl.
C02F 3/32 (2006.01)
C02F 3/34 (2006.01)
(Continued)

(52) U.S. Cl.
CPC .............. *C02F 3/327* (2013.01); *C02F 3/34* (2013.01); *C02F 2101/16* (2013.01);
(Continued)

(58) Field of Classification Search
CPC .... C02F 3/327; C02F 3/32; C02F 3/34; C02F 2101/16; C02F 2103/20; Y02W 30/43; Y02P 60/216
(Continued)

(56) References Cited

U.S. PATENT DOCUMENTS 3,635,816 A    1/1972   Golub
3,770,623 A    11/1973  Seidel
(Continued)

FOREIGN PATENT DOCUMENTS

FR    3013347 A1     5/2015
FR    3019171 A1    10/2015
WO   2008/124425 A1 10/2008

OTHER PUBLICATIONS

New Zealand Intellectual Property Office, First Examination Report issued in corresponding NZ Application No. 754049, dated Aug. 6, 2019, pp. 1-3.
(Continued)

*Primary Examiner* — Nam X Nguyen
*Assistant Examiner* — Julia L. Wun
(74) *Attorney, Agent, or Firm* — Pillsbury Winthrop Shaw Pittman LLP

(57) ABSTRACT

Media beds containing worms living in an oxygenated aqueous environment are provided for the remediation of water containing excreted and other oxidizable organic or chemical waste. The media beds may include cultivated plant life in addition to the cultivated worm population for the uptake of nitrates, as well as other nutrients rendered soluble through digestion of the worms to remediate water to levels sufficient to be safely returned to the environment; alternatively the water may be remediated to higher nitrate levels in the absence of plants so that the water can be used in subsequent fertilization operations outside the waste treatment system. The system further includes cultivated microbial populations that may be present in the media beds and/or in separate bioreactors within the system.

20 Claims, 12 Drawing Sheets

Related U.S. Application Data

(60) Provisional application No. 62/434,848, filed on Dec. 15, 2016.

(51) Int. Cl.
*C02F 101/16* (2006.01)
*C02F 103/20* (2006.01)

(52) U.S. Cl.
CPC ......... *C02F 2103/20* (2013.01); *Y02P 60/216* (2015.11); *Y02W 30/43* (2015.05)

(58) Field of Classification Search
USPC ............... 210/602, 601, 615, 616, 617, 620; 119/215, 224–227, 260
See application file for complete search history.

(56) References Cited

U.S. PATENT DOCUMENTS

| | | | | |
|---|---|---|---|---|
| 4,218,318 | A | * | 8/1980 | Niimi ................. C02F 3/04 210/150 |
| 4,333,837 | A | | 6/1982 | Plosz |
| 4,415,450 | A | | 11/1983 | Wolverton |
| 5,087,353 | A | | 2/1992 | Todd et al. |
| 5,893,975 | A | | 4/1999 | Eifert |
| 5,897,777 | A | | 4/1999 | Zoeller et al. |
| 5,976,374 | A | | 11/1999 | Cameron |
| 6,159,371 | A | | 12/2000 | Dufay |
| 6,200,469 | B1 | | 3/2001 | Wallace |
| 6,327,996 | B1 | | 12/2001 | Pruder et al. |
| 6,406,627 | B1 | | 6/2002 | Wallace |
| 6,447,682 | B1 | | 9/2002 | Flowers |
| 7,141,169 | B2 | * | 11/2006 | Koehler ............... C02F 3/32 210/602 |
| 8,677,686 | B1 | | 3/2014 | Nelson et al. |
| 9,232,702 | B1 | | 1/2016 | Nelson et al. |
| 2004/0065610 | A1 | | 4/2004 | Shankar et al. |
| 2007/0102354 | A1 | | 5/2007 | Flournoy et al. |
| 2007/0289922 | A1 | * | 12/2007 | Ladron de Guevara ............... C02F 3/02 210/605 |
| 2010/0031893 | A1 | | 2/2010 | Bodlovich et al. |
| 2010/0096322 | A1 | * | 4/2010 | Lushnikov ............ B09C 1/10 210/602 |
| 2012/0137977 | A1 | * | 6/2012 | Hermes ............... A01K 67/033 119/6.5 |
| 2013/0098848 | A1 | | 4/2013 | Frigon |
| 2014/0374343 | A1 | | 12/2014 | Gerino et al. |
| 2017/0013810 | A1 | | 1/2017 | Grabell et al. |

OTHER PUBLICATIONS

Patent Cooperation Treaty, International Search Report for PCT/US2017/066675, dated May 24, 2018, pp. 1-4.
Arora et al., Antibacterial and enzymatic activity of microbial community during wastewater treatment by pilot scale vermifiltration system, Bioresource Technology, 2014, pp. 132-141, vol. 166.
Arora et al., The effect of seasonal temperature on pathogen removal efficacy of vermifilter for wasterwater treatment, Water Research, 2015, pp. 88-99, vol. 74.
Burrell et al., Identification of Bacteria Responsible for Ammonia Oxidation in Freshwater Aquaria, Applied and Environmental Microbiology, Dec. 2001, pp. 5791-5800, vol. 67, No. 12.
Guzyte et al., Effects of Salinity on Earthworm (*Eisenia fetida*), Environmental Engineering, The 8th International Conference, May 19-20, 2011, pp. 111-114, Vilnius, Lithuania.
Hendrickx et al., The effect of operating conditions on aquatic works eating wast sludge, Water Research, 2009, pp. 943-950, vol. 43.
Jicong et al., The influence of Temperature, pH and C/N Ratio on the Growth and Suivival of Earthworms in Municipal Solid Waste, Agricultural Engineering International: the CIGR Ejournal, Nov. 2005, pp. 1-6, Manuscript FP 04 014, vol. VII.
Kumar et al., Performance evaluation of vermifilter at different hydraulic loading rate using river bed material, Ecological Engineering, 2014, pp. 77-82, vol. 62.
Kumar et al., Evaluation of vermifiltration process using natural ingredients for effective wastewater treatment, Ecological Engineering, 2015, pp. 370-377, vol. 75.
Labella et al., Assessing the economic suitability of aeration and the influence of bed heating on constructed wetlands, treatment efficiency and life-span, Ecological Engineering, 2015, pp. 184-190, vol. 83.
Lenntech, Nitrogen Cycle, retrieved from https://www.lenntech.com/nitrogen-cycle.htm on Mar. 19, 2018, p. 1.
Liu et al., Phylogenetic characterization of microbial communities in full-scale vermifilter treating rural domestic sewage, Ecological Engineering, 2013 pp. 100-109, vol. 61.
Malone, Recirculating Aquacutlure Tank Production Systems A Review of Current Design Practice, Southern Regional Aquaculture Center, Oct. 2013, pp. 1-12, Publication No. 453.
American Water Works Association, Nitrification, Aug. 15, 2002, pp. 1-17, United States Environmental Protection Agency, Office of Water (4601M0 Office of Ground Water and Drinking Water, Distribution System Issue Paper.
Bio-Con Labs, Nitrifying Bacteria Facts, retrieved from http://www.bioconlabs.com/nitribactfacts.html on Mar. 19, 2018, pp. 1-6.
Rakocy, Aquaponics—Integrating Fish and Plant Culture, Aquaculture Production Systems, Chapter 14, First Edition, 2012, pp. 1-44, John Wiley & Sons, Inc.
Sela, Iron Nutrient Management in Plants, retrieved from http://www.smart-fertilizer.com/articles/iron on Mar. 19, 2018, pp. 1-4.
Su et al., An investigation on the immunoassays of an ammonia nitrogen-degrading bacterial strain in aquatic water, Aquaculture, Jan. 1, 2016, pp. 17-22, vol. 450.
Tomar et al., Urban wastewater treatment using vermi-biofiltration system, Desalination, 2011, pp. 95-103, vol. 282.
Wang et al., Application of constructed wetlands for treating agricultural runoff and agro-industrial wastewater: a review, Hydrobiologia, 2018, pp. 1-31, vol. 805.
Xing et al., A comparative study of synchronous treatement of sewage and sludge by two vermifiltrations using an epigeic earthworm *Eisenia fetida*, Journal of Hazardous Materials, 2011, pp. 881-888, vol. 185.
R. Sing, et al., "A Mechanistic Review on Vermifiltration of Wastewater: Design, Operation and Performance," Journal of Environmental Management 197, (2017) pp. 656-672.
C.H. Ratsak, et al., "Sludge Reduction by Predatory Activity of Aquatic Oligochaetes in Wastewater Treatment Plants: Science or Fiction? A Review," Hydrobiologia (2006) 564, pp. 197-211.
W.A. Lennard, et al., "A Comparison of Three Different Hydroponic Sub-Systems (Gravel Bed, Floating and Nutrient Film Technique) in an Aquaponic Test System", Aquacult Int (2006) 14, pp. 539-550.
J. E. Rakocy, et al., "Recirculating Aquaculture Tank Production Systems: Aquaponics—Integrating Fish and Plant Culture", Oklahoma Cooperative Extension Service Fact Sheet SRAC-454, http://osufacts.okstate.edu.
C. A. Edwards, et al. "Human Pathogen Reduction During Vermicomposting", Chapter 16, pp. 249-261.
O. K. Vatamaniuk, et al. "Worms Take the "Phyto" Out of Phytochelatins", Trends in Biotechnology, vol. 20, No. 2. Feb. 2002, pp. 61-64, http://tibtech.trends.com.
M. B. Timmons, et al. "Solids Capture", Chapter 5, Recirculating Aquaculture, 3rd Edition, pp. 139-188; NRAC Publication No. 401-2013.
A. P. Bobade, et al. "The Use of Vermifilteration in Wastewater Treatment: A Review", Journal of Civil Engineering and Environmental Technology, vol. 3, Issue 2, Jan.-Mar. 2016, pp. 164-169.
N. Lorenco, et al. "Optimization of a Vermifiltration Process for Treating Urban Wastewater", Ecological Engineering 100 (2017) pp. 138-146, www.elsevier.com/locate/ecoleng.
H. J. H. Elissen, et al. "A New Reactor Concept for Sludge Reduction Using Aquatic Worms" Water Research 40 (2006) pp. 3713-3718, www.elsevier.com/locate/watres.

(56) References Cited

OTHER PUBLICATIONS

J. Dominguez, "State-Of-The-Art and New Perspectives on Vermicomposting Research", Earthworm Ecology, Second Edition, pp, 401-424.
J. Dominguez, "The Microbiology of Vermicomposting", Chapter 5, pp. 53-66.
C.A. Edwards, et al. "Biology and Ecology of Earthworm Species Used for Vermicomposting", Chapter 3, Vermiculture Technology, Earthworms, Organic Wastes, and Environmental Management, pp. 27-40.
A. L. H. Jack, "The Suppression of Plant Pathogens by Vermicomposts", Chapter 12, pp. 165-181.
C. A. Edwards, "How Earthworms Affect Plant Growth: Burrowing Into the Mechanisms", Earthworm Ecology, Second Edition, Chapter 2, pp. 13-50.
G. G. Brown, et al. "Functional Interactions Between Earthworms, Microorganisms, Organic Matter, and Plants" Earthworm Ecology, Second Edition, Chapter 12, pp. 213-239.
C. A. Edwards, et al. "The Use of Earthworms in the Breakdown of Organic Wastes to Produce Vermicomposts and Animal Feed Protein", Earthworm Ecology, Second Edition, Chapter 18, pp. 345-379.
J. E. Rakocy, "Aquaponics: Integrating Fish and Plant Culture", Chapter 19, pp. 663-710.
Komabayasi, Dissolved Oxygen in Rainwater, Journal of the Meteorological Society of Japan, p. 35-41. (Year: 1959).
Brezonik et al., Chapter 12 Dissolved Oxygen, Water Chemistry, p. 451-481. (Year: 2011).
Csuzdi et al., Data to the earthworm fauna of Myanmar with notes on some little known species (*Annelida,Oligochaeta*), 2015, Opusc. Zool. Budapest, 46(2), p. 177-182. (Year: 2015).

\* cited by examiner

MEDIA BED FOR WASTE STREAMS AND SYSTEMS EMPLOYING THE SAME

RELATED APPLICATIONS

This patent application is a continuation of U.S. patent application Ser. No. 15/843,798, filed Dec. 15, 2017, which claims the benefit of, and priority to, U.S. Provisional Patent Application No. 62/434,848 filed Dec. 15, 2016. The entire contents of the foregoing applications are hereby incorporated by reference in their entirety.

FIELD

The present invention is generally directed to methods and systems for treating waste streams and more particularly to methods and systems for treating waste streams employing a media bed.

BACKGROUND

Aquaculture is currently the fastest growing sector in food production around the world. Waste discharge is a key hurdle to the growth of the aquaculture industry and the adaptation of new production facilities. The development of an apparatus that allows for the safe, internal processing of solid waste within a recirculating aquaculture system allows for the controlled production of various aquatic species without concern of accidental release of specimens or harmful waste products, opening the door for aquaculture development across the globe.

Waste water from aquaculture generally contains high levels of suspended solid wastes and ammonia. Solid wastes degrade into ammonia under anoxic conditions, and they can use up much of the dissolved oxygen in the water when degrading under aerobic conditions. Both high levels of ammonia, regardless of dissolved oxygen level of the water, and low levels of dissolved oxygen are harmful to the aquatic species and plants being cultivated.

Prior systems for solid waste management require solid waste, and associated water, to be separated with solids collected and removed from the system, resulting in an increased loss of water, loss of nutrients in the solid waste, as well as a discharge of ammonia waste into local environments, which can be harmful to local biota. One current system employs a multi-valve, 4-tank system and uses a vertical bead filter commonly found on swimming pools. This system, however, requires significant training and is energy intensive. Additionally, these systems are not truly zero-discharge, as the system requires that excess solid waste build-up be removed from the system periodically.

In addition, Dr. James Rakocy, one of the leading experts in aquaponic system design, in 2012, in the book *Aquaculture Production Systems*, by Tidwell, pp 344-386, delivered a paper titled, *Aquaponic-Integrating Fish and Plant Culture*. In this paper, Dr. Rakocy noted the difficulties of using media beds in commercial aquaponic systems, specifically pointing out that these beds are prone to clogging, the formation of anaerobic zones, and potentially producing methane and hydrogen sulfide, which are highly toxic to fish.

Furthermore, Leonard and Lennard, in their paper, *A comparison of three different hydroponic subsystems: gravel bed, floating and nutrient film techniques, in an aquaponic test system, in Aquaculture International*, Vol 14, Issue 6, pp. 539-550, note the problems with utilizing media beds in an aquaponic system, citing the need to clean system media, and flush excess accumulated solid waste from the beds.

Therefore, there exists a need to provide an aquaponics system that removes harmful ammonia, maintains high levels of dissolved oxygen internally, and prevents accumulating solid waste from the beds, without discharging solid waste from the system.

SUMMARY

In some aspects, presented herein is an apparatus comprising a media bed comprising a biomass, wherein (i) the biomass comprises water and worms, (ii) the worms are submerged in the water, and (iii) the water comprises an oxygen content of at least 3 ppm. In certain embodiments, the water further comprises un-ionized ammonia at an amount of 5 ppm or less. In certain embodiments, the biomass comprises oxidizable waste. In some embodiments, the water comprises oxidizable waste. In certain embodiments, the media bed further comprising media (e.g., aggregates, fibers or particles). In some embodiments, a media bed comprises a minimum average, minimum mean or minimum absolute worm density of at least 100 worms/m$^3$, at least 500 worms/m$^3$, or at least 1000 worms/m$^3$, or at least 10,000 worms/m$^3$.

In some embodiments, a media bed comprises a container, a waste inlet, and a treated waste outlet and various conduits, pumps, valves and fittings configured to introduce aqueous waste into a media bed through the waste inlet and extract treated wasted from the media bed through the waste outlet.

In some aspects, presented herein, is a waste treatment system or aquaponics system comprising an apparatus or media bed described herein. Certain embodiments are directed to a closed aquaponics system that eliminates the need for discharging solid waste from the system and prevents accumulating solid waste from the beds, while removing harmful ammonia from the system that is converted into nitrates, which along with other nutrients resulting from oxidation of waste, can be absorbed by plants grown in one or more parts of the system, thus providing a true zero-discharge system. In some embodiments, the results are achieved through the combination of a media bed that employs the culture of annelid worms, the active aeration of the media beds, and the media bed being a continuous flow type.

In certain embodiments, a waste treatment system or aquaponics system comprises a fish tank, a separating tank, and a media bed. The fish tank comprises fish and water. In some embodiments, a fish tank comprises untreated, or partially treated aqueous waste. In certain embodiments, a separating tank is fluidly connected and/or operably coupled to the fish tank, and the media bed is fluidly connected and/or operably coupled to the separating tank thereby forming a closed fluid circuit. In some embodiments, one or more bio-reactors are fluidly connected in the system.

In some aspects, a method of treating solid and/or liquid waste is provided. In some embodiments the method comprises the use of a media bed or apparatus described herein. In certain embodiments, the method comprises the use of a system described herein. In some embodiments, a method includes the steps of providing a fish tank containing a fluid, providing a separating tank, providing a media bed, delivering the fluid to the separating tank, separating the fluid into solids and liquids in the separating tank, delivering the solids to the media bed and, the liquids to a bioreactor, converting ammonia in the liquids to nitrite, and nitrite into nitrate, delivering nitrate-rich liquids to the media bed, filtering the solids and nitrate-rich liquids through the media bed, removing nitrates and other nutrients from the water and delivering filtered liquids back to the fish tank. In certain embodiments, an aquaponics system is a closed system.

DETAILED DESCRIPTION

Figure 1:
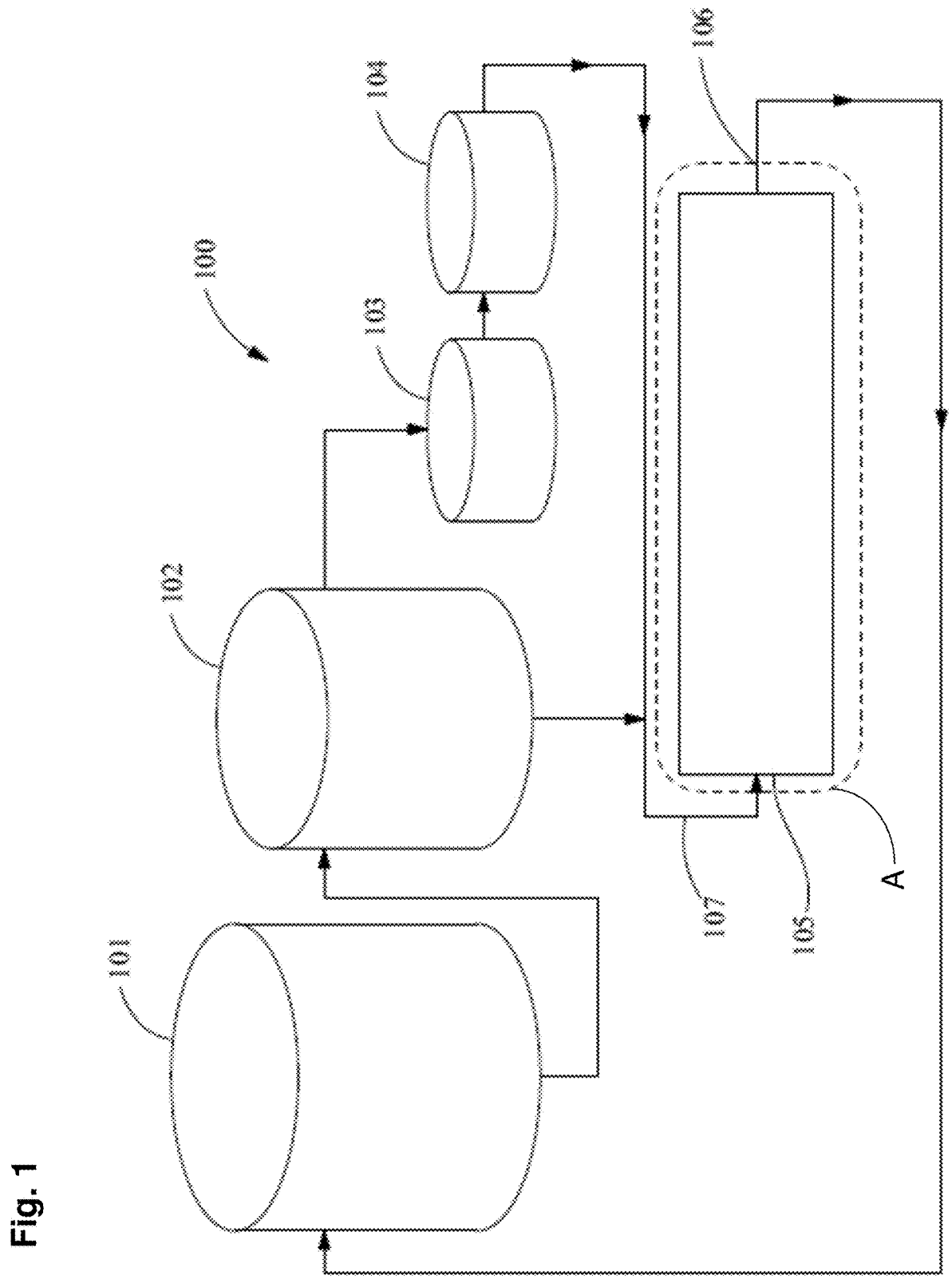
FIG. 1 shows a schematic embodiment of a waste treatment system (aquaponics system).

The process of using worms in composting is sometimes referred to as vermicomposting. Systems, apparatuses and methods described herein employ the use of worms for the treatment of waste. However, the systems, apparatuses and methods described herein differ significantly from vermicomposting in several aspects and provide substantial advantageous over vermicomposting methods. First, vermicomposting is limited to the use of relatively thin layers of worms, typically limited to a depth of less than 5 inches. Second, vermicomposting is conducted on relatively dry compost material with a minimal moisture content. This is because the worms typically die in worm beds that are too thick or too moist. Systems, apparatuses and methods described herein comprise novel media beds comprising a high density of viable worms, often greater than 5 inches in depth, where the earthworms are submerged in water and/or aqueous waste. The systems, apparatuses and methods described herein unexpectedly allow for high-density worm populations to maintain high levels of viability and high levels of activity while completely submerged in water, while also providing high-volume waste treatment that is orders of magnitude faster and more efficient than methods employing vermicomposting.

The inventors have determined that a media bed described herein can unexpectedly permit earthworms to survive, eat, and reproduce, all in an aquatic environment, thus expanding the utility of the earthworms to effectively remediate large volumes of biological wastes in a media bed without any dewatering of the waste. Annelid oligochaete earthworms and their associated gut microbes have the ability to reduce the particle size of waste and eliminate human pathogen contamination of waste. The worms can also chelate plant nutrients in the waste stream to make them more bioavailable to plants. In some embodiments, a system, apparatus or method described herein also uses heterotrophic microbes (including bacteria and archaea) to oxidize carbonaceous wastes that are reduced in size and increased in surface area by worms. In some embodiments, a system, apparatus or method described herein also uses chemotrophic microbes (including bacteria and archaea) to reduce the chemical oxygen demand and biological toxicity of waste by oxidizing ammonia to nitrites, and nitrites to nitrates. Carbon dioxide from the waste oxidation process ultimately leaves the system as a gas which may also be taken up by the plants, or incorporated into microbial biomass. In some embodiments, treated waste is converted into plant nutrients which can be directly concentrated into a plant fertilizer solution for use elsewhere. In some embodiments, nutrients from treated waste can be taken up by plants in a media bed bioreactor or other apparatus or system, non-limiting examples of which include floating beds, aeroponic towers, hydroponic systems, and soil growth beds operably coupled (e.g., fluidly connected) to a media bed bioreactor. Plant biomass (e.g., seeds, fruits, portions of plants or whole plants) is sometimes removed from a system for use elsewhere. Processed aqueous waste obtained from a system, apparatus or method described herein can be recirculated in a system, such as for use in aquaculture, or can be discharged from a system into the environment (e.g., after certain legal standards for nutrient and human pathogen removal are met).

Biomass

In some embodiments a system or apparatus comprises a media bed. In some embodiments, a media bed comprises a biomass and/or media. In certain embodiments, a biomass comprises water and worms. In certain embodiments, a biomass comprises microbes and/or plants. In certain embodiments, a biomass comprises worms, water, microbes and/or plants. In some embodiments, a biomass comprises nutrients and dissolved gases suitable for survival and viability of the worms in a biomass. In some embodiments, a media bed and/or biomass comprises waste (e.g., aqueous waste, oxidizable waste).

A biomass may be any suitable size or shape. In some embodiments, a biomass comprises a volume in a range of 5 to 10,000,000 liters, 5 to 1,000,000 liters, 5 to 100,000 liters, 5 to 10,000 liters, 5 to 5,000 liters, or 5 to 1000 liters. A biomass often adopts the size of the container, reservoir, tank or basin that it is contained in. In some embodiments, the depth of a biomass is at least 15 cm, at least 20 cm, at least 30 cm, at least 40 cm, at least 50 cm or at least 100 cm. In some embodiments, the depth of a biomass is in a range of 15 cm to 50 meters, 15 cm to 25 meters, 15 cm to 10 meters, 15 cm to 6 meters, or 15 cm to 3 meters.

In some embodiments, a biomass comprises a water content of about 30% to about 90%. Accordingly, in certain embodiments, a biomass is at least 20%, at least 25%, at least 30%, at least 40%, at least 50%, or at least 60% water (vol/vol). In some embodiments, the water content of a biomass is in a range of 25-90% water, 30-90% water, 35-90% water, 40-90% water, 25-80% water, 30-80% water, 35-80% water or 40-80% water (vol/vol).

In some embodiments, a media bed or biomass comprises fresh water having a salinity of less than 10, less than 8, less than 7, less than 6 or less than 5 parts per thousand (ppt). In some embodiments, the aqueous content of a media bed or biomass comprises a salinity of less than 10, less than 8, less than 7, less than 6 or less than 5 parts per thousand (ppt). In some embodiments, a media bed or biomass comprises brackish water or salt water having a salinity of greater than 6, greater than 7, greater than 8, greater than 10, greater than 15, or greater than 20 ppt. In some embodiments, the aqueous content of a media bed or biomass comprises a salinity greater than 6, greater than 7, greater than 8, greater than 10, greater than 15, or greater than 20 ppt.

Worms

A media bed or biomass often comprises worms. In some embodiments, a media bed comprises a biomass comprising worms. A media bed, or biomass of a media bed can comprise a worm density in a range from about 100 to about 100,000 worms per $m^3$. Accordingly, in certain embodiments, a media bed, or biomass comprises a minimum average, minimum mean or minimum absolute worm density of at least 100 worms/$m^3$, at least 200 worms/$m^3$, at least 300 worms/$m^3$, at least 400 worms/$m^3$, at least 500 worms/$m^3$, at least 1000 worms/$m^3$, at least 2000 worms/$m^3$, at least 4000 worms/$m^3$, at least 6000 worms/$m^3$, at least 8000 worms/$m^3$, or at least 10,000 worms/$m^3$. In certain embodiments, a media bed, or biomass comprises an average, mean or absolute worm density of about 100 worms/$m^3$ to about 100,000 worms/$m^3$, about 1000 worms/$m^3$ to about 100,000 worms/$m^3$, about 100 worms/$m^3$ to about 10,000 worms/$m^3$, about 500 worms/$m^3$ to about 10,000 worms/$m^3$, or about 1000 worms/$m^3$ to about 10,000 worms/$m^3$. In some embodiments, an optimal worm density is determined so that worms can traverse the pore space of the media beds without clogging the media bed and impeding the flow of water and oxygen.

In some embodiments, worms (e.g., a plurality of worms) in a media bed or biomass are substantially or completely submerged in water. In some embodiments, worms of a media bed or biomass are substantially or completely submerged within the aqueous content of a media bed or biomass. In some embodiments, worms of a media bed are substantially or completely under the surface of a biomass, and/or are under the surface of the aqueous content of a media bed or biomass. In some embodiments, the aqueous content of a media bed or biomass comprises water and/or aqueous waste, or a mixture thereof. Accordingly, in certain embodiments, worms of a media bed or biomass are in constant contact with water and/or are in constant contact with the aqueous portion of a media bed or biomass. In some embodiments, worms of a media bed or biomass are substantially or completely under water. In some embodiments, worms of a media bed or biomass are substantially or completely immersed in water and/or are immersed in the aqueous content of a media bed or biomass. Accordingly, worms (e.g., a plurality of worms) that are substantially submerged, substantially immersed, substantially in contact with, or substantially under water may have brief and/or intermittent contact with air on the surface of a media bed or biomass which brief or intermittent contact may last for a period of seconds or less. Accordingly, in some embodiments substantially all of the worms of a media bed or biomass described herein are completely submerged in water, or are completely submerged in the aqueous content of a media bed or biomass, at any one time (e.g., as determined at any one point in time). For example, at least 80%, at least 90% or at least 95% of the worms in a media bed or biomass are completely submerged in water, or are completely submerged in the aqueous content of a media bed or biomass at any one time.

Any suitable earthworm can be used for a system, apparatus or method described herein. A media bed or biomass may comprise any suitable earthworm. In some embodiments, an earthworm is an annelid oligochaete worm. A media bed or biomass may comprise a single species of earthworm or a mixture of two or more species of worms. In some embodiments, an earthworm is selected from the family of Acanthodrilidae, Ailoscolecidae, Almidae, Benhamiinae, Octochaetidae, Criodrilidae, Diplocardiinae, Acanthodrilidae, Enchytraeidae, Eudrilidae, Exxidae, Glossoscolecidae, Haplotaxidae, Hormogastridae, Kynotidae, Lumbricidae, Lutodrilidae, Megascolecidae, Microchaetidae, Moniligastridae, Ocnerodrilidae, Octochaetidae, Octochaetinae, Sparganophilidae, or Tumakidae. In some embodiments, a media bed or biomass comprises one or more species of earthworms, non-limiting examples of which include *Alloborpha callignosa, Eisenia fetida, Eisenia andrei, Dendrodrilus rubidus, Dendrobaena hortensis, Dendrobaena veneta, Lumbricus rubellus, Lumbricus terrestris, Drawida nepalensis, Eudrilus eugeniae, Perionyx excavates, Polypheretima elongate*, and *Lampito maurittii* and related families Other worms, such as flat worms, pot worms (e.g., Enchytraeidae and related family, including both terrestrial and aquatic), tubifex worms (e.g., Tubificidae and related family, generally considered aquatic) may also be used. In certain embodiments, a media bed or biomass comprises worms of the species *Eisenia fetida*. Earthworms are generally preferred for freshwater applications, while other types of worms may be more readily employed in waters containing elevated salinity, such as saltwater and/or brackish water applications. In some embodiments, worms utilized in saltwater applications of this invention are a variety of marine annelid worms and include mud worms of the genus *Poludora* and clam worms of the family Nereididae. Mud worms aid in breaking down organic waste in the system, while clam worms aid in decreasing the buildup of algae and other solids within the system. In addition to marine annelid worms, marine environment worms of the family Naididae (formerly Tubificisae) are contemplated for use, which can aid in the breakdown of waste within the beds. In some embodiments, an earthworm of a media bed or biomass described herein is a terrestrial worm. In certain embodiments, an earthworm of a media bed described herein is not an aquatic worm.

Oxygenation & Growth Conditions

In certain embodiments, a system, apparatus or media bed described herein is aerated or oxygenated. In some embodiments, a media bed, a biomass, or the aqueous content thereof is aerated or oxygenated. In some embodiments, water of a media bed or biomass is aerated or oxygenated. In some embodiments, aqueous waste is aerated or oxygenated. In some embodiments, a method described herein comprises aerating or oxygenating a media bed or biomass.

Accordingly, in some embodiments, a media bed, a biomass, water in media bed or biomass, or the aqueous content of a media bed or biomass comprises an oxygen content (i.e., dissolved oxygen content) of at least 3 ppm, at least 3.1 ppm, 3.2 at least ppm, at least 3.3 ppm, at least 3.4 ppm, at least 3.5 ppm, at least 3.6 ppm, at least 3.7 ppm, at least 3.8 ppm, at least 3.9 ppm, at least 4.0 ppm, at least 4.5, at least 5 ppm, at least 5.5, at least 6 ppm, at least 7 ppm, at least 8, at least 9 or at least 10 ppm. In some embodiments, a media bed, a biomass, water in a media bed or biomass, or the aqueous content of a media bed or biomass comprises an oxygen content (i.e., dissolved oxygen content) of at least 3 ppm, at least 3.1 ppm, 3.2 at least ppm, at least 3.3 ppm, at least 3.4 ppm, at least 3.5 ppm, at least 3.6 ppm, at least 3.7 ppm, at least 3.8 ppm, at least 3.9 ppm or at least 4.0 ppm. In some embodiments, a media bed, a biomass, water in media bed or biomass, or the aqueous content of a media bed or biomass comprises an oxygen content in a range of about 3 ppm to about 12 ppm, about 3.5 ppm to about 12 ppm, about 4 ppm to about 12 ppm, about 4.5 ppm to about 12 ppm, about 5 ppm to about 12 ppm, about 5.5 ppm to about 12 ppm, about 6 ppm to about 12 ppm, about 3 ppm to about 15 ppm, about 3.5 ppm to about 15 ppm, about 4 ppm to about 15 ppm, about 4.5 ppm to about 15 ppm, about 5 ppm to about 15 ppm, about 5.5 ppm to about 15 ppm, about 6 ppm to about 15 ppm, about 3 ppm to about 10 ppm, about 3.5 ppm to about 10 ppm, about 4 ppm to about 10 ppm, about 4.5 ppm to about 10 ppm, about 5 ppm to about 10 ppm, about 5.5 ppm to about 10 ppm, or about 6 ppm to about 10 ppm. In certain embodiments, a media bed, a biomass, water in media bed or biomass, or the aqueous content of a media bed or biomass comprises an oxygen content in a range of about 3 ppm to about 12 ppm, or about 3.5 ppm to about 12 ppm. In some embodiments, a biomass or the aqueous content of a biomass comprises an oxygen content in a range of about 3 ppm to about 12 ppm, or about 3.5 ppm to about 12 ppm.

Most earthworms have an optimal temperature range for viability of about 15-25° C., an optimal pH range of 6.5 to 8.6, and thrive when C:N ratios in their food are between 5:1 and 25:1. C:N rations, temperature and/or pH of a media bed or biomass can be adjusted to a suitable level to optimize for worm viability and/or biological activity within a media bed or biomass.

In some embodiments, a C:N ratio of a media bed or biomass is increased or decreased to allow for optimal worm and/or microbe activity. In some embodiments, a media bed comprises a C:N ratio between 5:1 and 25:1 or between about 10:1 and 20:1. Accordingly, in certain embodiments, a method described herein comprises adjusting, increasing, decreasing and/or maintaining the C:N ratio of a media bed or biomass to a range of about 5:1 to 25:1, 8:1 to 25:1, 8:1 to 27:1, or about 10:1 to about 20:1. The C:N ratio of a media bed or biomass can be adjusted and/or maintained using any suitable method. In some embodiments, the C:N ratio of a media bed or biomass is adjusted and/or maintained by controlling influent of carbon into a media or a combination thereof. In some embodiments, the C:N ratio of a media bed or biomass is increased, adjusted and/or maintained by controlling influent of carbon and/or adding a carbon source into a media. Non-limiting examples of carbon sources that are used to increase or maintain the C:N ratio of a media bed include vegetable waste (e.g., potato waste and oat straw waste), shredded paper, the like or combinations thereof. In some embodiments, the C:N ratio of a media bed or biomass is decreased, adjusted and/or maintained by controlling influent of nitrogen and/or adding a nitrogen source into a media. Non-limiting examples of nitrogen sources that are used to decrease or maintain the C:N ratio of a media bed include swine waste, dairy waste, protein (e.g., whey protein, offal, egg albumin), ammonia, urea, urine, the like or combinations thereof.

In some embodiments, a temperature of a media bed or biomass is increased or decreased to allow for optimal worm and/or microbe activity. Accordingly, in certain embodiments, a method described herein comprises adjusting, increasing, decreasing and/or maintaining the temperature of a media bed or biomass to a range of about 15-30° C., about 15-25° C., about 20-30° C., about 20 to about 27° C., or to a range of about 25-30° C. Temperature of a media bed or biomass can be adjusted and/or maintained using any suitable method. In some embodiments, the temperature of a media bed or biomass is adjusted and/or maintained by insulating a media bed or container thereof (e.g., by placing a media bed or container in the ground, or by use of suitable insulating materials), by use of an in-line heating system or heat exchanger, by natural means (e.g., by evaporation), by use of a suitable cooling system, or a combination thereof.

In some embodiments, a pH of a media bed or biomass is increased or decreased to allow for optimal worm and/or microbe activity. Accordingly, in certain embodiments, a method described herein comprises adjusting, increasing, decreasing and/or maintaining the pH of a media bed or biomass to a range of about 6-9, about 6.5-8.6, about 6.5-8.2, or to a range of about 6.5-8.0. The pH of a media bed or biomass can be adjusted and/or maintained using any suitable method. In some embodiments, the pH of a media bed or biomass is increased and/or maintained by addition of calcium carbonate, calcium biocarbonate, potassium carbonate, or a combination thereof. In some embodiments, the pH of a media bed or biomass is decreased and/or maintained by addition of nitric acid, muriatic acid, phosphoric acid, or a combination thereof. In some embodiments, the pH of a media bed or biomass is decreased and/or maintained by use of a reverse osmosis filter to pull carbonates from the water to lower the pH.

Waste

Presented herein, in certain embodiments, are systems and/or an apparatus, or portions thereof, for use in treating waste having a relatively high water content. In some embodiments, a media bed or biomass comprises waste. In certain embodiments, waste is aqueous waste. In some embodiments, the water content of aqueous waste is at least 30%, at least 40%, at least 50%, at least 60%, at least 70%, at least 80%, or at least 90% water (vol/vol). Aqueous waste may comprise particulate waste and/or soluble waste. Aqueous waste may comprise particles (e.g., solid particles of waste, solid particles of oxidizable waste) having an average, mean, or absolute diameter of less than less than 10 mm, less than 5 mm, less than 2 mm, less than 1 mm, less than 500 nm, less than 100 nm, less than 10 nm, less than 1 nm, less than 500 microns or less than 100 microns. In some embodiments, aqueous waste comprises particles (e.g., solid particles of waste, solid particles of oxidizable wastes) having an average, mean, or absolute diameter of less than less than 10 mm, less than 5 mm, less than 2 mm, or less than 1 mm. In some embodiments, aqueous waste comprises particles (e.g., solid particles of waste, solid particles of oxidizable wastes) having an average, mean, or absolute diameter in a range of about 10 mm to 1 μm, 5 mm to 100 μm, or 5 mm to 1 nm. In some embodiments, aqueous waste has a viscosity at 25° C. of less than 10 Pa/s, less than 1 Pa/s, less than 100 mPa/s, or less than 10 mPa/s. In some embodiments, aqueous waste has a viscosity at 25° C. in a range of about 10 Pa/s to about 0.7 mPa/s, 1 Pa/s to about 0.7 mPa/s, 100 mPa/s to about 0.7 mPa/s, 50 mPa/s to about 0.7 mPa/s, or about 10 mPa/s to about 0.7 mPa/s. In some embodiments, aqueous waste comprises oxidizable waste and/or biodegradable waste. In some embodiments, aqueous waste comprises at least 50%, at least 75%, at least 80%, at least 90% or at least 95% oxidizable waste and/or biodegradable waste. In some embodiments, aqueous waste comprises about 90% to 100% oxidizable waste and/or biodegradable waste. Non-limiting examples of oxidizable waste include organic biological waste derived from animals or humans (e.g., excretions, urine and/or feces; e.g., fish feces, livestock manures, human sewage, sewage sludge, the like or combinations thereof), waste from food processing of animals or plants, and plant material (e.g., compost, and the like). In some embodiments, oxidizable waste comprises oxidizable chemical wastes, non-limiting examples of which include particular or soluble ammonia, nitrite, nitrate, phosphorous, and phosphates. In some embodiments, oxidizable waste comprises oxidizable and/or biodegradable carbohydrates, fatty acids, proteins and lipids.

In some embodiments, aqueous waste is obtained directly from a suitable waste source (e.g., from a river, stream, aqueduct, reservoir, a lake, agricultural run-off, sewage stream, and the like). Aqueous waste may comprise untreated, partially treated or filtered waste. In some embodiments, waste is pre-processed by a suitable method comprising grinding, blending, and/or filtering to obtain aqueous waste of a suitable water content, a suitable particle content and/or viscosity for use in a system, apparatus or method described herein. In some embodiments, aqueous waste is derived or obtained by a process that does not require filtering. Non-limiting examples of a waste source include a river, a stream, an aqueduct, a reservoir, a lake, agricultural run-off, a sewage stream, a sewage reservoir or holding tank, farm run-off, water from a fish hatchery, commercial or industrial waste, household waste, street run-off, brackish water, the like or combinations thereof. Additional non-limiting examples of a waste source include a fish tank, a separator tank, a holding tank, a bioreactor, a sump tank, and the like.

In some embodiments, aqueous waste, a media bed, biomass, or aqueous content thereof comprises a low amount of un-ionized ammonia. Un-ionized ammonia is the fraction of total ammonia nitrogen (TAN) in an aqueous environment that is highly toxic to many aquatic organisms. $NH_3$ is the principal form of toxic ammonia. $NH_3$ has been reported toxic to freshwater organisms at concentrations ranging from 0.53 to 22.8 ppm (mg/L). Toxic levels are both pH and temperature dependent. Toxicity increases as pH increases and as temperature increases. Accordingly, in certain embodiments, a media bed, biomass or aqueous content thereof comprises less than 5 ppm, less than 1 ppm, or less than 0.5 ppm un-ionized ammonia. In some embodiments, aqueous waste that is introduced into a media bed or biomass comprises a content of un-ionized ammonia that is less than 5 ppm, less than 1 ppm, or less than 0.5 ppm.

Microbes

In some embodiments, a media bed, biomass or bioreactor comprises one or more species of microbes. In some embodiments, a media bed, biomass or bioreactor comprises heterotrophic microbes (including bacteria and archaea). Heterotrophic microbes can oxidize carbonaceous wastes made small and of a high surface area to volume ratio by worms. This requires dissolved oxygen, without which other competing microbes inherent in the environment and many waste streams will become dominant in the system and convert biosolids to methane. Chemotrophic microbes (including bacteria and archaea) reduce the chemical oxygen demand and biological toxicity of the waste stream by oxidizing ammonia to nitrites and nitrites to nitrates. They are generally considered to be chemolithotrophs—meaning they live on substrates (like rocks, gravel, etc.) in a sheet like coating. These bacteria use inorganic carbon (such as $CO_2$) as their carbon source to construct organic molecules.

Examples of bacteria that can convert ammonia to nitrite include, but are not limited to, *Nitrosomonas*, *Nitrosospira*, *Nitrosococcus*, and *Nitrosolobus*. Examples of archaea that can convert ammonia to nitrite include, but are not limited to, *Nitrosopumilus*, and *Nitrososphaera*. Examples of bacteria that convert nitrite to nitrate, include, but are not limited to, *Nitrobacter*, *Nitrospina*, and *Nitrococcus*. Accordingly, in some embodiments, a media bed 105, biomass or bioreactor (103 or 104) described herein comprises one or more genus of microbes selected from *Nitrosomonas*, *Nitrosospira*, *Nitrosococcus*, *Nitrosolobus*, *Nitrosopumilus*, *Nitrososphaera*, *Nitrobacter*, *Nitrospina*, and *Nitrococcus*. In some embodiments, a media bed, biomass or bioreactor comprises bacteria of the species *Nitrosomonas europaea* (ATCC 25978), which can be used to oxidize ammonia to nitrite, and/or *Nitrobacter winogradskyi* (ATCC 25391), which can be used in oxidizing nitrite to nitrate. In some embodiments, a separate bioreactor located upstream of a media bed may comprise the microbes or bacteria described herein. Accordingly, in some embodiments, one or more microbes present in an upstream bioreactor may be introduced into a downstream media bed 105.

Container

In some embodiments, an apparatus comprises one or more media beds. In some embodiments a media bed comprises a container 2, a waste inlet and/or an outlet, wherein the container often comprises worms. In some embodiments a container comprises the biomass and/or media. In some embodiments, a container comprises a waste inlet 107 and an outlet 106. In some embodiments, a media bed 105 includes a container 2 constructed to provide containment of the bed contents, e.g., the media and water being remediated, aqueous waste, as well as the worms and other living organisms cultivated therein. In some embodiments a media bed and/or container comprises media, plumbing, and/or other components. In some embodiments, the container 2 may be fiberglass reinforced polypropylene. In some embodiments, the container 2 may be formed by lining an excavated trench with an impermeable liner, such as, but not limited to a rubber liner, a sealed woven liner, a plastic line and/or a concrete liner.

Figure 3:
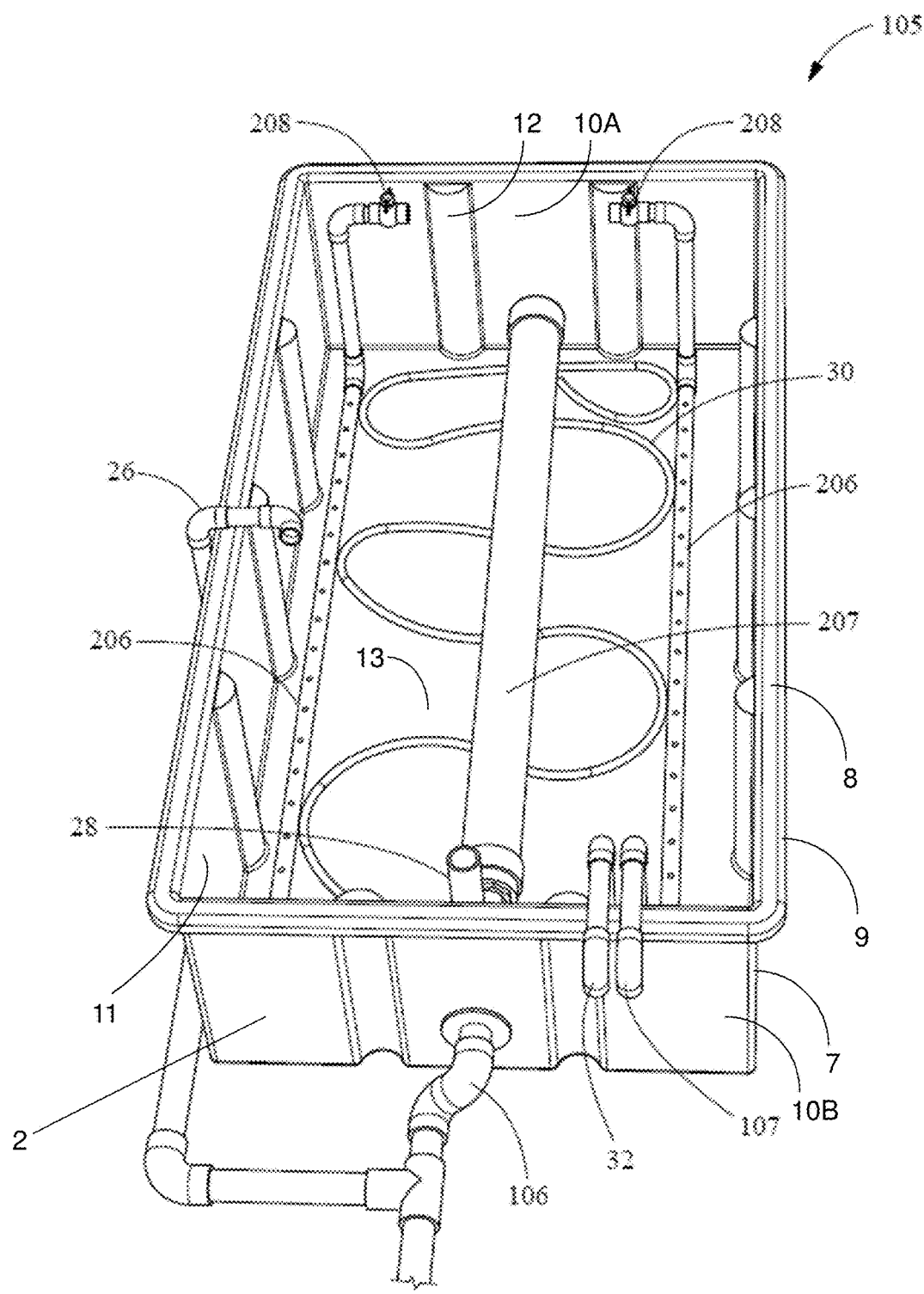
FIG. 3 shows a top perspective view of an embodiment of a media bed 105.

A container can be made of any suitable material, non-limiting examples of which include concrete, block, stone, rubber, glass, wood, plastics, fiberglass, earth (e.g., dirt), the like and combinations thereof. In some embodiments, a container 20 is made of, or comprises fiberglass-reinforced polypropylene. A media bed 105 may be constructed for any suitable volume, shape and geometry. Accordingly, a container can be any suitable shape (e.g., round, rectangular, asymmetrical). In some embodiments, a container comprises one or more sidewalls and a bottom. A bottom may be contiguous and substantially coextensive with one or more sidewalls of the container. In some embodiments, a container comprises one sidewall, for example when a container is circular or cylinder shaped. One embodiment of a rectangular media bed 105 comprising a container 2 is shown in FIG. 3. In certain embodiments a container 2 comprises four side walls (10 and 11) arranged in a substantially rectangular shape and a bottom 13 substantially coextensive with the container sidewalls. In some embodiments, a container comprises a top, for example a sealed top. In some embodiments the four sidewalls are coextensive and secured to a bottom 13 thereby forming an open box-like configuration (e.g., a box with 4 sides, a bottom and no top). Sometimes a sidewall and/or a bottom of a container is substantially rectangular in shape. In some embodiments a container comprises two opposing sidewalls 11 and two opposing sidewalls 10 (e.g., 10A and 10B). Sometimes a container sidewall and/or container bottom is substantially flat and/or substantially planar. Sometimes a container sidewall and/or container bottom comprises ribs (e.g., interior ribs or supports, exterior ribs or supports) or one or more supporting buttresses 12. Sometimes a container sidewall and/or container bottom comprises no ribs (e.g., interior ribs or supports, exterior ribs or supports) or buttresses. In some embodiments two sidewalls of a container (e.g., 10 and 11) are joined at a junction 7. Sometimes a container comprises 3 or more junctions. Sometimes a substantially rectangular container comprises four junctions. Sometimes a junction comprises a curve and/or a corner.

In some embodiments a container is substantially round or circular. In some embodiments a container sidewall or bottom is substantially curved. In some embodiments a container comprises a single sidewall that is substantially curved and substantially concentric. In some embodiments a container resembles the shape of a cylinder. In some embodiments, a container is substantially asymmetrical resembling the shape of a naturally occurring or manmade pond, lake, pool, basin or trough.

The term substantially planar means that a surface lies in a plane and that some portions of the surface, (e.g., less than about 20%, less than about 15%, less than about 10%, less than about 5%, less than about 4%, less than about 3%, less than about 2% or less than about 1% of the surface) may lie outside of a plane. The term substantially flat means that a surface is flat and may comprise some imperfections and/or deviations. For example a surface that is substantially flat may comprise bumps, texture, embossed indicia, divots, a slight bow, a slight curve, the like or combinations thereof. Sometimes a surface that is substantially flat may comprise a slight bow comprising an arc with a height of about 1 mm or less.

Sometimes a container sidewall and/or a container bottom is not flat. For example sometimes a container sidewall and/or a container bottom comprises ribs (e.g., interior ribs, supports). Sometimes a container sidewall and/or a container bottom is textured or comprises projections (e.g. ridges, grips, knobs, wells, bumps, steps). In certain embodiments a container sidewall and/or a container bottom comprises a curve or a bow, (e.g., a convex or concave bow).

In some embodiments one or more sidewalls of a container are perpendicular to the container bottom. In certain embodiments a container sidewall is not perpendicular to a container bottom. In some embodiments a container sidewall is oriented at an angle from about 30 to about 110 degrees relative to a container bottom.

In some embodiments a container is configured to contain a liquid. In some embodiments a container is a basin. In some embodiments a container bottom and container sidewalls are sealed and can contain a liquid (e.g., without leaking). In some embodiments a container is substantially water tight (e.g., with the exception of integrated drains, waste inlet and outlet plumbing). In some embodiments a container is substantially air tight (e.g., for a completely closed system). In some embodiments an interior surface of a container bottom 13 comprises features (e.g., wells, shallow wells, air inlets, depressions, ridges or troughs) that can be used to assist in fluid handling (e.g., fluid transport, draining) or to increase surface area. In some embodiments a container bottom comprises one or more features arranged in a suitable array.

In some embodiments a container sidewall comprises a buttress 12. In some embodiments a container comprises 1 or more buttresses. A buttress, without being limited to theory, often provides rigidity and/or strength (e.g., compressive strength, lateral strength) to a wall (e.g., a sidewall). In some embodiments a buttress reinforces a wall. Sometimes a buttress provides a point of engagement for machine (e.g., a modified fork lift) to move a container, or position and/or hold a container within a media bed. In some embodiments a container comprises at least four buttresses. In some embodiments a container comprises 2 to 30 buttresses. Sometimes a container comprises 1, 2, 3, 4, 5, 6, 7, 8, 9, 10, 11, 12, 13, 14, 15, 16, 17, 18, 19 or 20 buttresses. In some embodiments a container comprises 10 buttresses. In some embodiments a sidewall comprises one or more buttresses and sometimes 2 or more buttresses. In some embodiments a sidewall comprises 1 to 10 buttresses. Sometimes a sidewall comprises 1, 2, 3, 4, 5, 6, 7, 8, 9, 10, 11, or 12 buttresses. In certain embodiments a sidewall comprises 2 to 4 buttresses. In certain embodiments, a container comprises 8 buttresses where each sidewall of the container comprises 2 buttresses. Sometimes buttresses are on adjoining sidewalls and sometimes are at or near a wall junction 7. In some embodiments a container comprises one or more clasping, clamped, diagonal, angled, setback, and/or "French" buttresses.

In certain embodiments, a container comprises a ridge 8 and/or a lip 9. In some embodiments a ridge or a lip are configured for storage and handling of a container. In some embodiments a ridge and a lip are configured to direct overflow away from a container sidewall. In some embodiments, a ridge and/or lip provide an attachment site for various hardware (e.g., hardware used to secure plumbing fixtures to a media bed).

A media bed or container of a media bed may comprise any suitable volume, width, length or diameter. In some embodiments a media bed and/or container comprises a depth of at least at least 15 cm, at least 20 cm, at least 30 cm, at least 40 cm, at least 50 cm, at least 100 cm or at least 1 meter. In some embodiments, the depth of a container is in a range of 15 cm to 60 meters, 15 cm to 40 meters, 15 cm to 30 meters, 15 cm to 25 meters, 15 cm to 20 meters, 15 cm to 15 meters, 15 cm to 6 meters, or 15 cm to 3 meters. In some embodiments a media bed and/or container comprises a depth of about 6 inches to 50 feet, about 10 inches to 50 feet, about 1 foot to 50 feet, about 1.5 feet to 50 feet, about 2 feet to 50 feet. In some embodiments a media bed and/or container comprises a depth of about 6 inches to 50 feet, about 6 inches to 40 feet, about 6 inches to 20 feet, about 6 inches to about 10 feet, about 10 inches to 50 feet, about 10 inches to 40 feet, about 10 inches to 20 feet, about 10 inches to 10 feet, about 1 foot to 50 feet, about 1 foot to 40 feet, about 1 foot to 20 feet, about foot to about 10 feet, or about 1 foot to about 4 feet.

In some embodiments a media bed or container of a media bed comprises a suitable volume. In certain embodiments a container comprises a volume of 5 liters to 1,000,000 liters, 5 liters to 100,000 liters, 5 liters to 10,000 liters, 5 liters to 5,000 liters or 5 liters to 1,000 liters.

In some embodiments, a container comprises a suitable aeration means configured to introduce air and/or oxygen into the contents of a container. In certain embodiments, an aeration means is configured to introduce air and/or oxygen into a media bed, biomass or aqueous content thereof. In some embodiments, an aeration means is configured to introduce air and/or oxygen into the water of a media bed. Any suitable aeration means can be used. In certain embodiments, an aeration means comprises one or more pumps operably coupled to one or more air inlet conduits and/or to one or more air inlets. In certain embodiments, an air inlet and/or an air inlet conduit comprises a suitable pipe or tube. In some embodiments, an air inlet, or portion thereof, comprises a port, hole or opening. An air inlet may comprise one or more air inlet holes or ports integrated in the bottom or sidewalls of a container. In certain embodiments, an aeration means comprises one or more tanks comprising compressed air operably coupled to one or more air inlet conduits which are operably coupled to one or more air inlets. Accordingly, a container may comprise one or more air inlets (e.g., holes or ports). In some embodiments an air inlet conduit comprises a first end operably coupled to an air source or oxygen source (e.g., a pump or pressurized tank) and a second open end submerged in media bed, biomass or aqueous content thereof. In some embodiments an air inlet conduit, or a portion thereof is perforated or comprises a plurality of holes. In some embodiments an air inlet conduit comprises a first end operably coupled to an air source or oxygen source (e.g., a pump or pressurized tank) and a portion of the conduit and/or a second end of the conduit is submerged in a media bed, biomass or aqueous content thereof. In some embodiments, the portion of the air inlet conduit that is submerged is perforated or comprises a plurality of holes. In some embodiments an aeration means is configured to introduce air or concentrated oxygen into a media bed, a biomass or aqueous content thereof. In some embodiments, an aeration means comprises an air inlet 32 operably coupled to an air inlet conduit 32, where the air inlet conduit 32 is perforated thereby allowing air or oxygen to escape the conduit and enter into the contents of the container (e.g., the biomass). In certain embodiments, an aeration means comprises stones, disc diffusers, diffuser air lines, mixers, the like or combinations thereof. In certain embodiments, oxygenation is accomplished through active aeration (floating beds where roots hang down into oxygenated water), nutrient film technology (NFT) gutters (where water flows in a shallow sheet and is oxygenated by diffusion from the atmosphere), dutch buckets (where water is pulsed through buckets that drain between fillings), or spraying the water (causing a mist of nutrient rich water in an air environment).

In some embodiments, a media bed or container comprises a waste inlet (e.g., 107). In certain embodiments, a media bed or container thereof comprises one or more waste inlets. A waste inlet is often configured to provide aqueous waste to a media bed or container thereof. In some embodiments, a waste inlet is operably coupled to one or more waste conduits located in the interior of a container or media bed. Non-limiting examples of a conduit includes a pipe, tube, channel, the like and combinations thereof. Accordingly, in certain embodiments, a waste conduit comprises one or more pipes or tubes. A waste conduit can have any suitable dimensions. In some embodiments, a waste conduit (e.g., a pipe or tube) has an inside diameter of at least 1 cm, or in a range of 1 cm to about 1 meter. In some embodiments, a waste conduit is operably coupled to one or more valves (e.g., a ball valve, e.g., 208) and/or fittings (e.g,. adapters, T-fittings, elbows, clamps, and the like). Accordingly, a waste conduit often comprises one or more valves. In some embodiments, a waste conduit comprises one or more manifolds (e.g., 206). A manifold often comprises a plurality of perforations or holes configured to release oxidizable waste from the conduit into the media bed or container.

In some embodiments, an inlet 32 is operably coupled to one or more conduits, one or more waste manifolds 206, one or more valves and one or more fittings. In certain embodiments, a waste conduit comprises a first end comprising an opening, optionally coupled to a valve (e.g., 208) and second end operably coupled to an inlet (e.g., 107), wherein the opening has an inside diameter of at least 1 cm, or in a range of 1 cm to about 1 meter. In some embodiments, a waste conduit comprises one or more regulators, and/or gauges.

In some embodiments, a waste inlet (e.g., 107) is operably coupled to a waste intake system located exterior to a media bed or container thereof. A waste intake system can comprise a pump (e.g., a waste pump, e.g., 245), various conduits, fittings, regulators, valves, gauges and the like, all operably coupled and configured to remove waste from a waste source and deliver the waste to the waste inlet 107, which intern delivers the waste to the media bed or container. Accordingly, in certain embodiments, a waste inlet is operably coupled to a waste pump configured to introduce waste into a media bed or container through one or more waste conduits. In certain embodiments a waste pump comprises an input port 301 and an output port 300, where a waste inlet of a media bed is operably coupled to an output port of a waste pump. In some embodiments, an input port of a waste pump is operably coupled to a waste intake conduit (e.g., 246) located exterior to a container or media bed. In some embodiments, a waste intake conduit comprises a first end (e.g., an open end, e.g., 305) located at or in a waste source and a second end operably coupled to an input port (e.g., 301) of a waste pump (e.g., 245). A waste pump and/or a waste intake system is configured to transport waste from a waste source to a media bed, or from a waste source to an interior of a container (e.g., a container of a media bed). In some embodiments, a waste pump (e.g., a waste intake pump; e.g., 245) is operably coupled to a return conduit (e.g., 303) having a first end operably coupled to an output port (e.g., 300) of a waste pump and a second end (e.g., an open end, e.g., 304) located at or in a waste source (e.g., sump tank 230). In some embodiments, a second end of a return conduit comprises an opening. A return conduit can comprise one or more fittings, valves, regulators, or gauges operably coupled to the return conduit. In some embodiments, a waste intake system comprises an intake conduit, a return conduit and optionally, one or more fittings, adaptors, valves, regulators or gauges.

Figure 9:
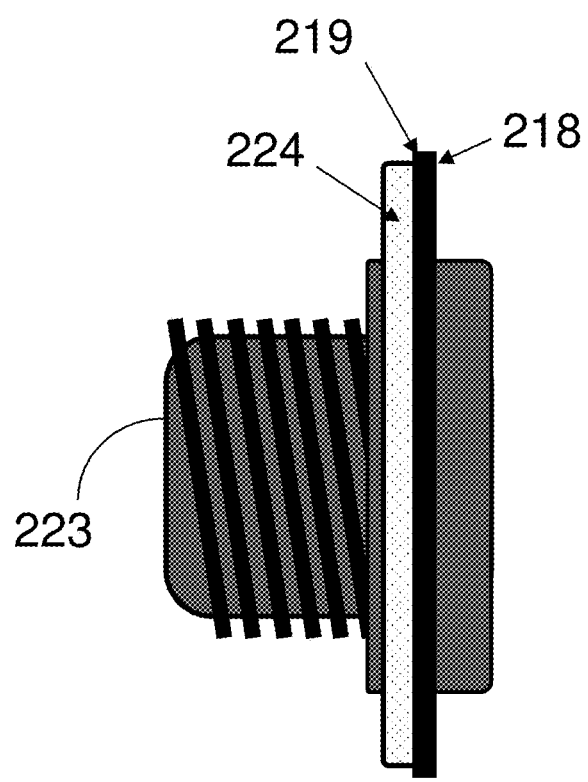
FIG. 9 shows a cross section of an embodiment of a bulkhead assembly.
Figure 10:
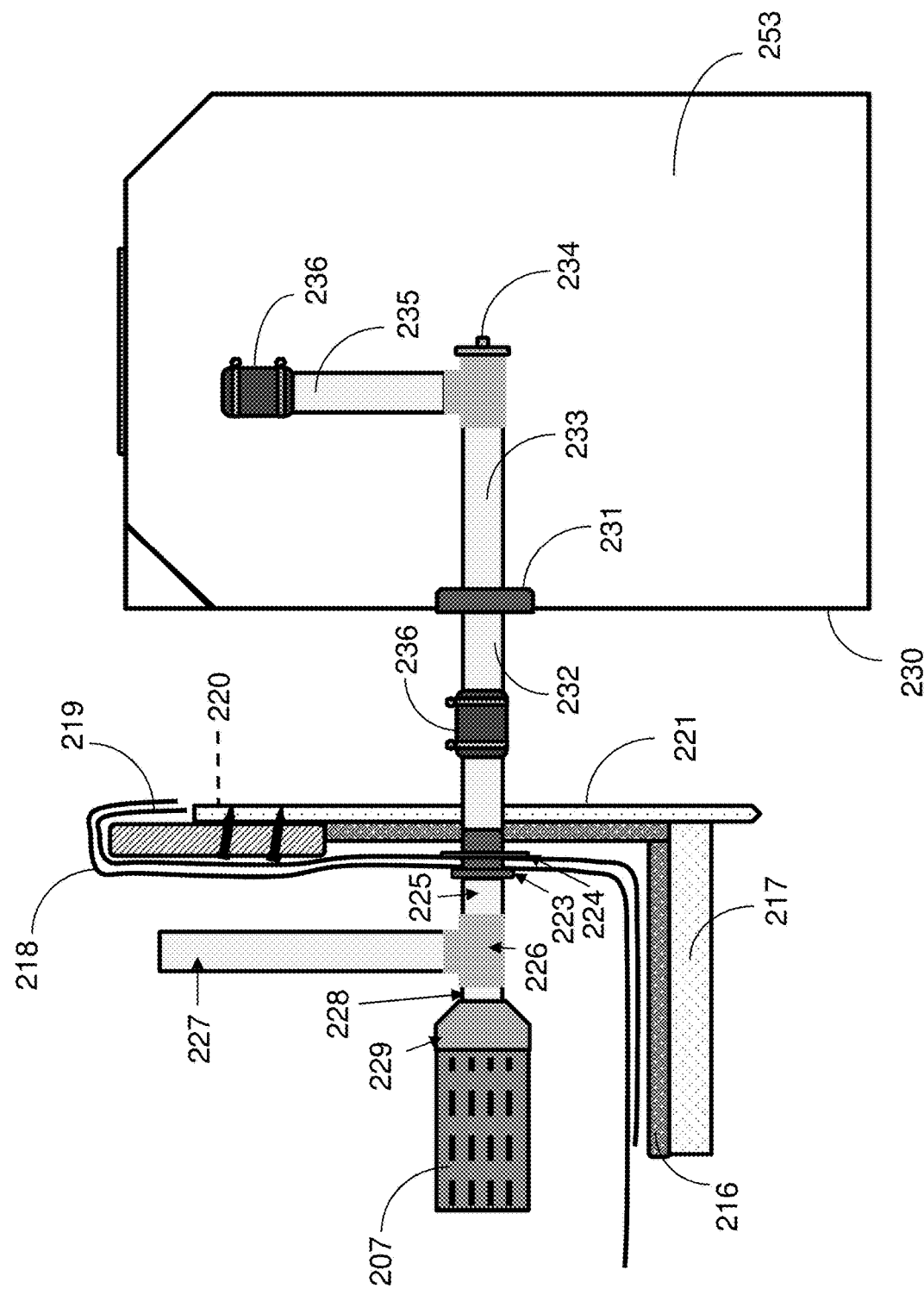
FIG. 10 shows a cross section of a portion of an aquaponics system showing a cross section of a media bed and a sump tank.
Figure 11:
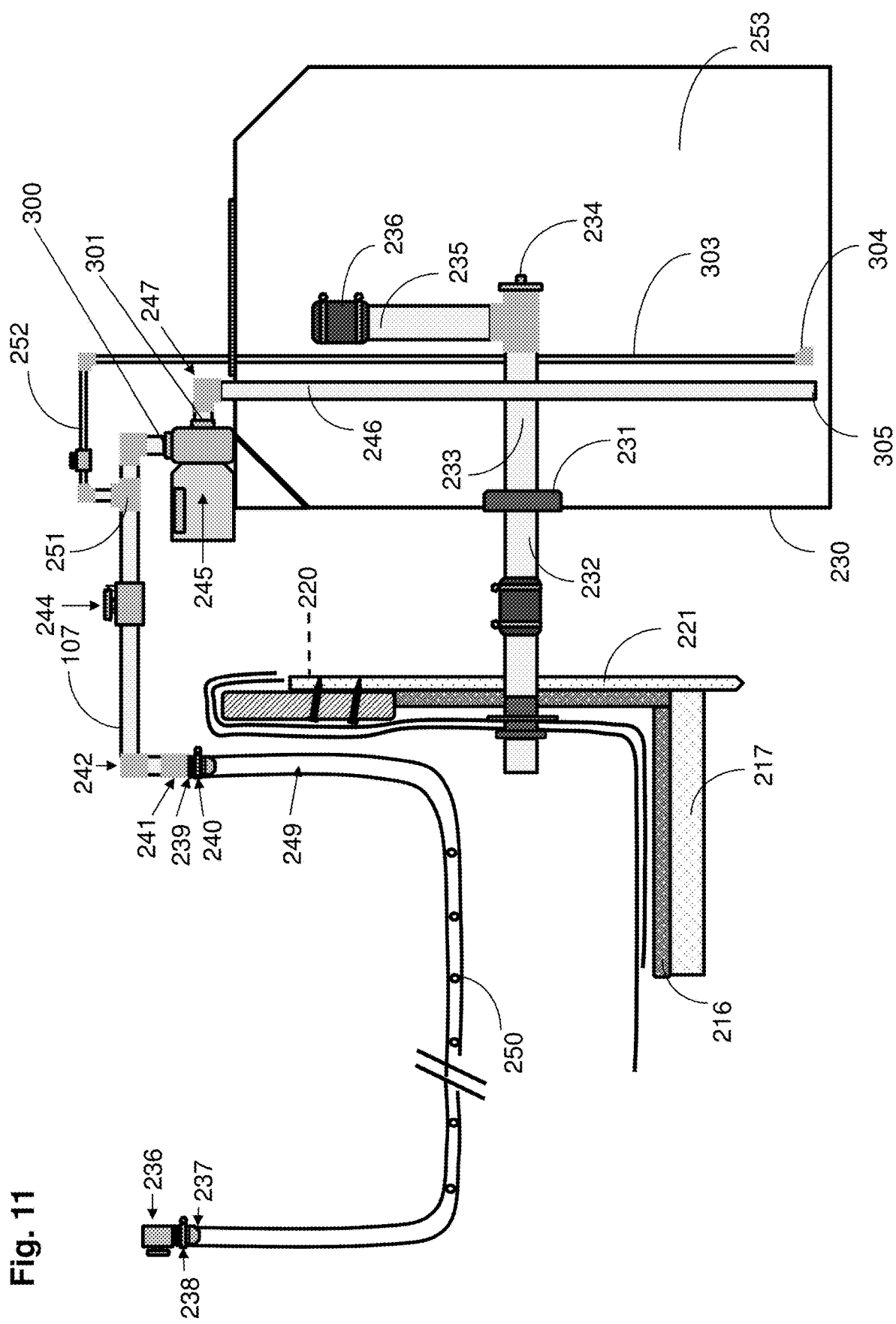
FIG. 11 shows a cross section of a portion of a waste treatment system or aquaponics system showing a cross section of a media bed and a sump tank. The system shown comprises a waste intake system (e.g., comprising 244, 251, 252, 247, 246, and pump 245), inlet 107, and waste conduits.
Figure 12:
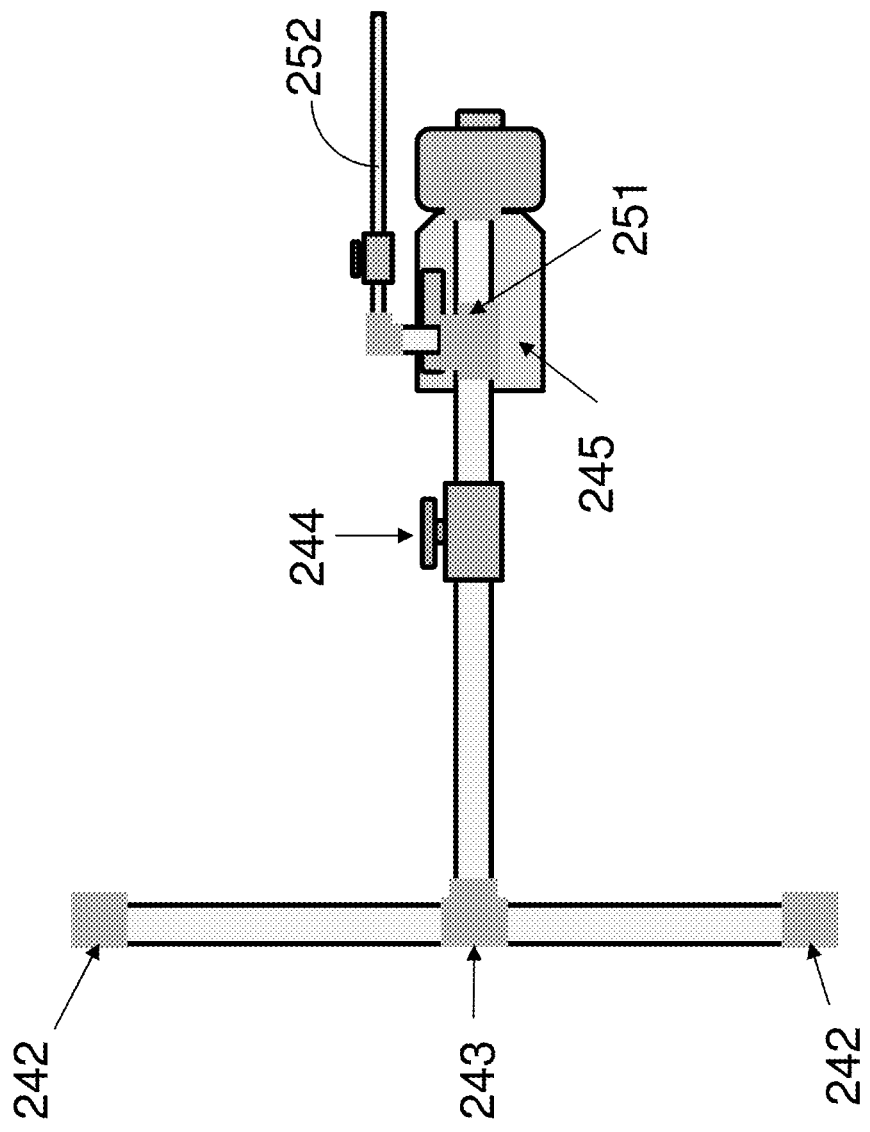
FIG. 12 shows an embodiment of a waste inlet supply assembly.

In some embodiments, a media bed or container comprises a treated waste outlet 106 configured for removal of treated wasted from a media bed or container. In certain embodiments, a treated waste outlet comprises a bulkhead assembly (e.g., see FIG. 9) comprising a bulkhead 223 operably integrated into a sidewall or bottom of a container. In certain embodiments a treated waste outlet is operably coupled to one or more treated waste outlet conduits (e.g., 207) located in the interior of a media bed or container. In certain embodiments, a bulkhead comprises an interior side located inside a container, and an exterior side located outside a container, and the interior side of the bulkhead is operably coupled to one or more treated waste outlet conduits. A treated waste outlet conduit can be any suitable conduit configured to transport aqueous material. In some embodiments, a treated waste outlet conduit comprise pipes or tubes. A treated waste conduit may have any suitable diameter. In some embodiments, a treated waste outlet conduit has an inside diameter of at least 1 cm, or in a range of about 1 cm to about 1 meter, or larger. In certain embodiments, a treated waste outlet conduit comprise one or more valves, regulators, gauges, and/or fittings (e.g., T-fittings, elbows, adapters, clamps, and the like). In some embodiments, a treated waste outlet conduit comprises a manifold or filter. In some embodiments, a manifold comprises a plurality of perforations or holes. In some embodiments, a treated waste outlet conduit comprises an overflow drain or stand pipe (e.g., 28 or 227) comprising a first end comprising an opening, wherein the opening has an inside diameter of at least 1 cm, or in a range of 1 cm to about 1 meter.

In some embodiments, a treated waste outlet is operably coupled to a treated waste return conduit (e.g., 232 & 233). In some embodiments, a treated waste return conduit is located outside of or exterior to a media bed or container thereof, and is configured to transport treated wasted from the waste outlet to a waste source or holding tank or reservoir. Accordingly, in some embodiments, a treated waste return conduit terminates at a waste source. A treated waste return conduit can be operably coupled to one or more pumps, valves, fittings, regulators, gauges, and the like. In certain embodiments, a treated waste return comprises a stand pipe (e.g., 235) operably coupled to, or terminating at or in a waste source (e.g., sump tank 230). In certain embodiments, a waste return comprises one or more pumps, valves (e.g., 236), fittings, regulators, gauges, and the like. In some embodiments, a treated wasted return conduit comprises an open end terminating at a waste source. In some embodiments, a treated waste return conduit in configured to release or direct treated waste into the environment. In some embodiments, a treated waste return conduit is operably coupled to a discharge conduit terminating with an open end, optionally coupled to a valve configured for discharge of treated waste into an external environment.

In some embodiments, an apparatus described herein comprises a homogenizer, blender, grinder and/or blender pump. In certain embodiments, a media bed or container thereof comprises a homogenizer, blender, grinder and/or blender pump. In some embodiments, a waste source comprises a homogenizer, blender, grinder and/or blender pump.

In some embodiments, a media bed or container comprises one or more water inlets for introducing water into a media bed or container.

Media

In some embodiments a media bed, or a container of a media bed, comprises media. Without being limited to theory, media allows for the free flowing of the aqueous waste stream, water and oxygen. The coarse structure of the media in the media bed can provide a stable structure through which the worms can move, eat, anchor and reproduce. In the absence of a suitable media, the worms can be washed from the media bed. The physical structure of the media can further provide a high surface area for chemotrophic microbes that can oxidize ammonia to nitrite and nitrite to nitrate. The worms, in turn, can eat excess bacteria and biological wastes between and on the media that, in turn, allows for free flow of oxygenated and waste rich water throughout the bed. Additionally the media bed can provide a physical structure for plants and their supporting roots to anchor, if they are employed in the system. Thus, media beds in accordance with exemplary embodiments that include the presence of worms allow the flow of nutrient rich, oxygenated water that can then be intercepted by plant roots for incorporation into plants and removed from the system. In use, the media bed 105 contains one or more types of biologically inert, non-soil media (omitted from FIG. 3 for clarity of illustration of the plumbed connections). In some embodiments, the media is suitable for supporting plant life to accomplish nutrient uptake.

In some embodiments, media comprises aggregates, fibers or particles. In some embodiments, media particle size may range from as small as about 10 microns (e.g., in the case of sand) up to about 5 cm (e.g. gravel), or more. In certain embodiments, media comprises particles, fibers and/or aggregates, each individually, or collectively, having a minimum mean, minimum average or minimum absolute diameter of at least 5 microns, at least 10 microns, at least 100 microns or at least 1 mm. In certain embodiments, media comprises particles, fibers and/or aggregates, each individually, or collectively, having a mean, average or absolute diameter of 5 microns to 100 cm, 10 microns to 100 cm, 5 microns to 50 cm, 10 microns to 50 cm, 100 microns to 50 cm, 5 microns to 25 cm, 10 microns to 25 cm, 100 microns to 25 cm, 5 microns to 10 cm, 10 microns to 10 cm, or 100 microns to 10 cm. In certain embodiments, media comprises particles, fibers and/or aggregates, each individually, or collectively, having a mean, average or absolute diameter of 5 microns to 100 cm, 10 microns to 100 cm, 5 microns to 50 cm, 10 microns to 50 cm, 100 microns to 50 cm, 5 microns to 25 cm, 10 microns to 25 cm, 100 microns to 25 cm, 5 microns to 10 cm, 10 microns to 10 cm, or 100 microns to 10 cm. Non-limiting examples of media include activated carbon, granular activated carbon (GAC), pelletized activated carbon, polymeric fibers, crushed stone, pumice, sand, plastic media, gravel, recycled glass, expanded lightweight aggregate, the like, and combinations thereof.

While a media bed 105, or contents thereof, is flooded with water and the worms are thus submerged, that actual volume of water in a media bed depends at least partially on the particular media employed and the resulting pore space. Generally the content of water in a media bed may be as low as 10% up to about 90% by volume water, more typically about 10% to about 70% by volume water, and in some embodiments is about 30% to about 70% by volume water, such as about 40% by volume water. In some embodiments, the water content of a media bed is at least 30%, at least 40%, at least 50%, at least 60%, at least 70%, at least 80%, or at least 90% water (vol/vol). In some embodiments, the water content of the contents of a media bed or contents of a media bed container (e.g., a mixture heterogeneous mixture comprising one or more of media, water, worms and aqueous waste) is at least 30%, at least 40%, at least 50%, at least 60%, at least 70%, at least 80%, or at least 90% water (vol/vol).

In some embodiment, the amount of aqueous waste introduced into a media bed is limited by the amount of ammonia (dry weight) in the waste, which should not exceed the mass (wt) of worms in the media bed by more than a factor of 2. Accordingly, in some embodiments, the amount of ammonia introduced into a media bed per day has a ratio of ammonia to worms (ammonia:worms (wt/wt)) of less than about 2:1, less than about 1.7:1, less than about 1.5:1, less than about 1.2:1, less than about 1:1, or less than about 0.9:1.

In some embodiments, the flow of aqueous waste into a media bed is less than about 100,000 liter/kg/day (vol. aqueous waste/wt. of worms in media bed/time), less than 10,000 liter/kg/day, 1000 liter/kg/day, or less than about 1000 liter/kg/day. In some embodiments, the amount of aqueous waste introduced into an apparatus or media bed described herein is in a range of 100,000 liter/kg/day (vol. aqueous waste/wt. of worms in media bed/time) to about 1 liter/kg/day, 10,000 liter/kg/day to about 1 liter/kg/day, 1,000 liter/kg/day to about 1 liter/kg/day, or about 100 liter/kg/day to about 1 liter/kg/day.

Plants

In some embodiments, a media bed or biomass comprises plants. A wide variety of plants may optionally be cultivated in a media bed 105. The cultivation of plants results in the uptake of nitrates and other nutrients resulting from the oxidation of animal or plant waste. The plants remove nitrates and other nutrients that would be harmful to the surrounding environment if directly discharged. Alternatively, the media bed may be free of plants such that the effluent in the media bed discharge stream is high in nitrate content and oxidized waste that can then be directed for use in fertilizer applications outside of the media bed, either in other vessels fluidly connected within the waste treatment system (float beds, towers, nutrient film technology (NFT) and float beds, for example) and/or to provide a nutrient rich water for use outside the waste treatment system that can be concentrated for use as fertilizer or for direct use on terrestrial plant crops in more traditional growing settings (e.g., greenhouses, irrigation of fields, etc.).

Plants in media beds can be species that are considered terrestrial (such as lettuce and tomatoes) but the oxygenation of the media beds allows their roots to thrive in an aqueous environment. Any suitable plant can be used in a media med or biomass described herein, non-limiting examples of which include bananas, tomatoes, beets, brassica family species (mustard family), fruiting crops, sunflowers, *Ipomea aquatica* (water spinach), *Typha* spp, (cattails), *Juncus* spp. (rushes), *Scirpus* spp. (club rushes and bull rushes), and *Hydrilla vercilata* (water thyme). In certain embodiments for waste remediation, hyper-accumulators of metals such as sunflowers, *Ipomea aquatica* (water spinach), *Typha* spp, (cattails), *Juncus* spp, (rushes), *Scirpus* spp. (club rushes and bull rushes), *Hydrilla vercilata* (water thyme), and others can be used to used to maximize the uptake of waste and contaminates from the beds.

Systems

In some embodiments, a waste treatment system or aquaponics system is a true zero-discharge system; bio-solids and oxidizable ammonia are hazardous to sustaining cultivated fish and plant life in the system but are so effectively remediated to levels below those which are toxic to the fish and plant species within the system that no periodic discharge is required to reduce toxin levels.

A fish tank 101 may be any kind of tank or pool that contains fish or other cultured aquatic life in a life-sustaining liquid, typically fresh-water. The fish tank may further include liquid waste and solid wastes excreted by the fish or other aquatic life. The fluid, including the waste product, flows from the fish tank 101 to a separating tank 102. The separating tank 102 may be any suitable separation apparatus to separate solid wastes from the liquid. Suitable apparatus for the separating tank includes, but is not limited to, sand filters, bead filters, baffled clarifiers, membrane filters, settling tanks, or combinations thereof. In some embodiments, the separating tank 102 is a collection tank or a settling tank, in which solids fall out of the liquid by gravity.

The separated solids or solid wastes may be directly delivered to the media bed 105. Similarly, the separated liquid i.e., water containing ammonia and other liquid waste (as well as suspended solid waste) may also be directed to the media bed 105 without removal of the solid waste from the water, providing it is well mixed and can penetrate the spaces between media in the bioreactor bed. As illustrated in FIG. 1, the separated liquid is directed to one or more bioreactor(s) 103, 104 in which the separated liquid undergoes further treatment to oxidize the waste in each stream, such as converting ammonia to nitrite, and nitrite to nitrate in the liquid stream.

In one embodiment, a first bioreactor 103 contains bacteria that converts ammonia to nitrite, while a second bioreactor 104 receives flow from the first bioreactor 103 and contains bacteria that convert nitrite to nitrate. In one embodiment, bacteria in bioreactor 103 may be the same kind as bacteria in bioreactor 104. In another embodiment, bacteria in bioreactor 103 may be dissimilar to bacteria in bioreactor 104.

Although shown as two separate vessels to form two separate bioreactors, it will be appreciated that a single bioreactor may be employed with both classes of bacteria (those converting from ammonia to nitrite and those converting from nitrite to nitrate) both present in the same bioreactor. Likewise, it will further be appreciated that more than two bioreactors may be employed in series. The number of bioreactors may depend in part on the levels of impurity contained in the fluid as well as the size of the bioreactor, which may be provided as any vessel that can contain a suitable volume of liquid to host the bacteria.

In some embodiments, the bioreactors may include a large volume of net-like elements such as net, wire, grid, guide wire grid, or combinations thereof, providing high surface area to facilitate bacterial growth. Different types of net-like elements may be used for each bioreactor, depending on the kind of bacteria contained in it.

As illustrated, ammonia in the liquid leaving the separating tank 102 is converted to nitrite in the bioreactor 103, and formed nitrite is converted to nitrate in turn in the bioreactor 104. A high conversion of ammonia to nitrate is desired because plants (such as those grown in a media bed) consume only nitrates, while ammonia and nitrite are harmful to most plant life, although some conversion of ammonia to nitrates occurs throughout the entire system, particularly within the column of media within the media bed 105. However, it will be appreciated, as discussed previously with respect to the media bed, that in some embodiments, the bioreactor(s) may be omitted entirely, with all of the bacteria necessary to convert ammonia to nitrate present directly in the media bed. Generally, the use of solid/liquid separator 102, such as a clarifying, swirl filter, or other equipment, to supply liquid waste to bioreactors 103, 104 for conversion to nitrates and usable nutrients is most advantageous when it is desired to direct nutrient rich water to other growing equipment other than or in addition to media beds; for example, NFT gutters, vertical towers, float beds, dutch buckets, etc. When enough plants are cultivated in the media bed to absorb all nutrients (or the nutrients are discharged for fertilizer), the use of separate bioreactors 103, 104 may be omitted.

Referring still to FIG. 1, from the bioreactor(s), the water, now rich in nitrates, flows to the media bed 105, in which it is remediated by the presence of the filtration media and worms as already described. In this closed system, exemplary embodiments achieve a balance of removing fish waste that would be harmful to plants by converting it into nitrates, while the plants in the media bed 105 (and/or in other growing apparatus that might be included and to which the nutrient rich water is directed within the closed-loop system) remove nitrates that would be harmful to the fish and/or the surrounding environment if directly discharged.

Figure 2:
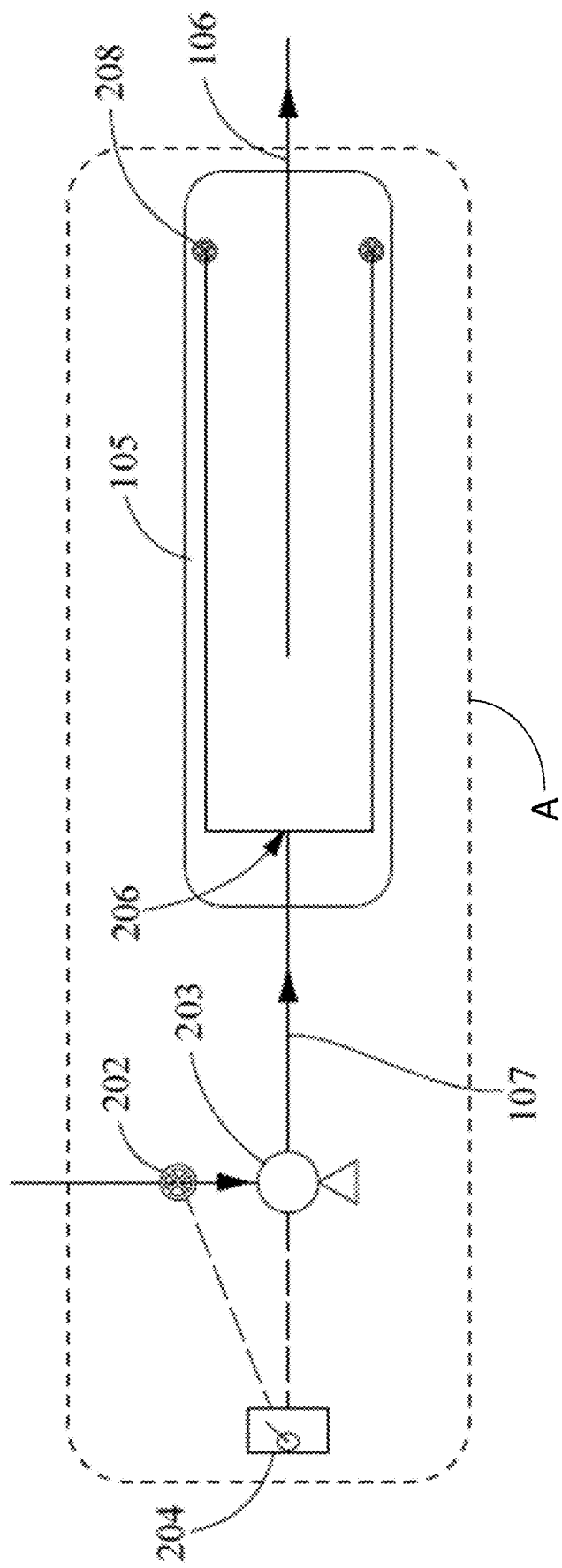
FIG. 2 shows an enlarged view A of FIG. 1.

FIG. 2 shows a more detailed schematic of an embodiment of a portion of a system 100 relating to the media bed 105 is shown. In this embodiment, a pump 203 is in communication with an incoming waste stream which is either a primarily solid waste stream released from the separating tank 102, a flow of water containing the liquid leaving the bioreactor 104, or a combined flow. Supply of the waste stream to the pump is preferably and advantageously controlled by a single valve 202. Similarly, the operation of the pump 203 may also be controlled by a single switch 204. Generally, the valve 202 is positioned so that the waste stream is flowing from the second bioreactor 104, with periodic operation to feed accumulated solid waste from the separating tank 102 (with which will also flow some incoming liquid from the separating tank).

Figure 4:
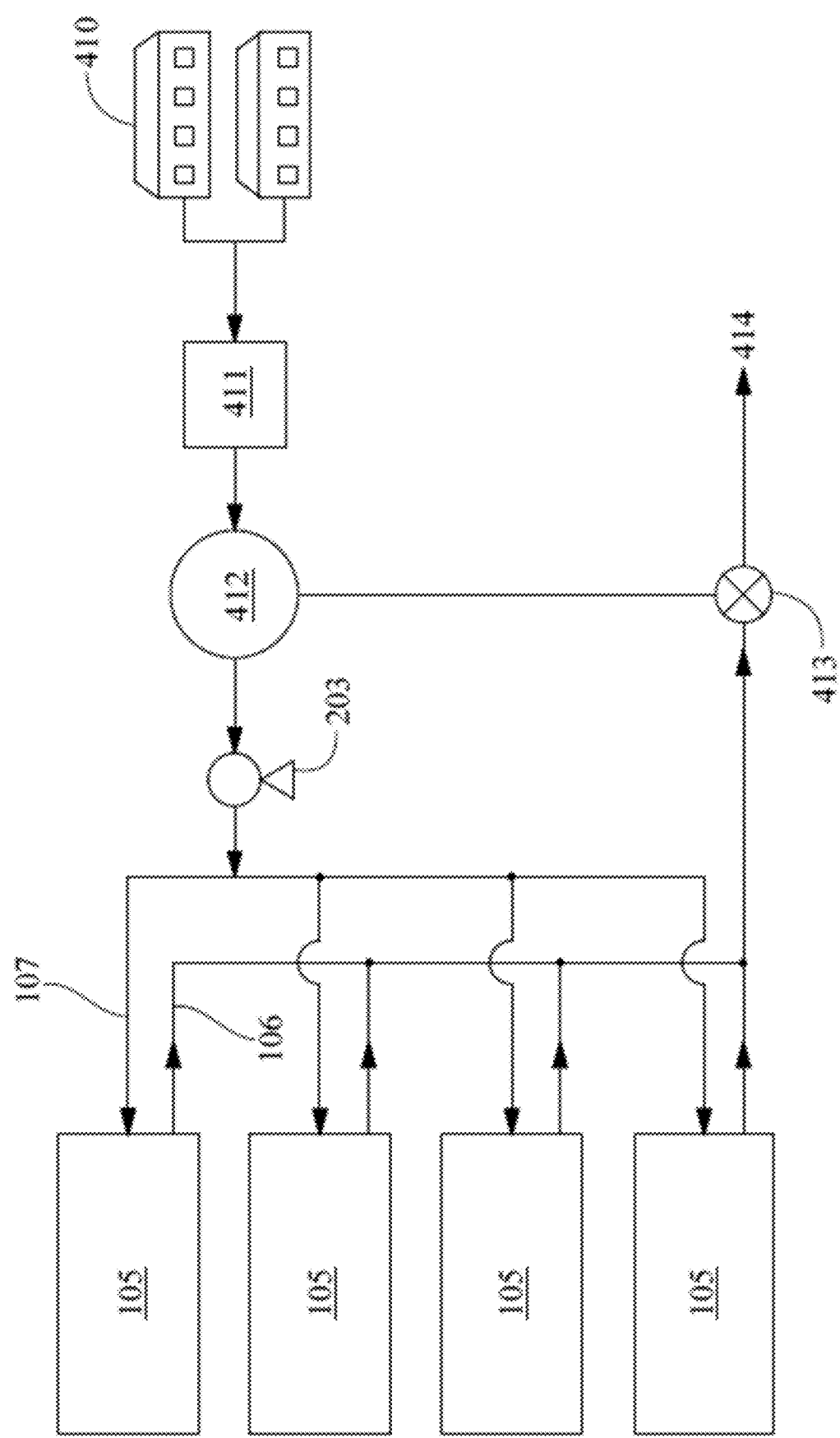
FIG. 4 schematically illustrates an embodiment of a waste treatment system for the remediation of water containing animal waste.

FIG. 4 shows another embodiment of a system illustrating that a plurality of media beds 105 may be used in parallel within a waste treatment system. FIG. 4 illustrates the ability of the media bed(s) as described herein to be used in other types of waste treatment, such in terrestrial animal waste reduction. One or more agriculture facilities, such as animal houses 410, provide a waste source of animal waste that may be in the form of raw manure and/or waste-laden runoff from cleaning operations within the animal houses 410, for example.

Depending on the source of the animal waste, it may be desirable or necessary for the manure to undergo one or more preliminary treatment steps prior to introduction into the waste treatment cycle. For example, when treating chicken or other animal waste, a drier/pelletizer 411 may be employed to first sanitize the raw manure source.

The waste can then be introduced into the recirculated water stream, which may advantageously be accomplished in a mixing tank 412 to homogenize the waste and recirculation streams into a pumpable fluid. The combined stream is then directed to pump 203 for introduction into the media bed(s) 105 in the manner previously described. It will be appreciated that in some embodiments, the pump 203 may be a blender pump and that the waste and recirculation streams may be combined and homogenized directly in the pump apparatus without the need for a separate mixing tank.

From the media beds, at least a portion of the remediated water can be directed back to the mixing tank 412 or pump 203 as part of the circulation stream. It will be appreciated however, that while the system may be closed, some or all of the remediated water may instead be removed from the cycle via a discharge port 414 controlled by a valve 413. The water may be sufficiently remediated to a level that is safe to discharge into the environment, such as a stream or municipal water supply, or may be remediated to a desired elevate nitrate level for subsequent use in fertilization in applications external the waste treatment system.

The embodiment illustrated in FIG. 4 shows four separate media beds 105 in parallel. The use of multiple media beds in parallel may be useful for accommodating large volumes of water while also providing for different media and/or the cultivation of different crops in each of the beds 105.

Figure 5:
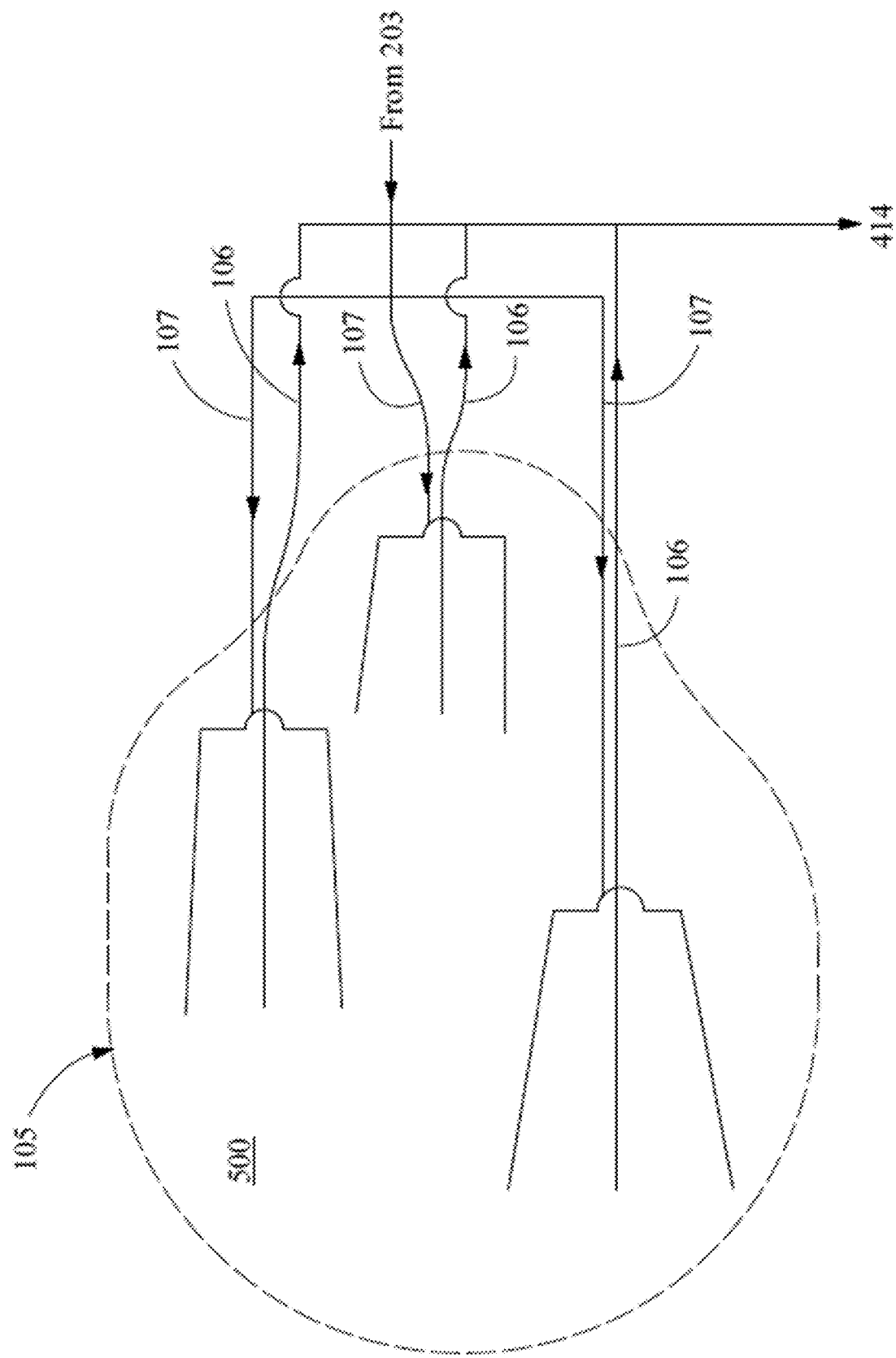
FIG. 5 schematically illustrates another embodiment of a media bed.

Alternatively, large volumes may be also accommodated using a single, large basin 500 as the media bed with multiple, parallel inlet and outlet plumbing in order to still efficiently distribute the flow throughout the bed, as illustrated in FIG. 5. FIG. 5 also shows an example of the single basin 500 having an aesthetic, irregular geometry that is more pond-like. Although media bed containers can generally be situated above or below ground, the basin 500 illustrated in FIG. 5 can be formed using a pool or pond liner for in-ground settings, helping to give the appearance of a wetland. The basin 500 may even be cultivated with native wetland plants instead of crops to aid in the aesthetic and to decrease the operational expense of the bed.

Although primarily discussed thus far in the context of freshwater systems, some embodiments also pertain to the processing of biodegradable or oxidizable organic and/or chemical waste streams in applications in which wastewater contains high levels of salinity, such as salt-water aquaculture or the remediation of waste from salt-water sources.

The microbes in such applications are generally still of the same family Nitrobacteraceae as those in freshwater application, particularly species of *Nitrosomonas* and *Nitrobacter*. However, while the freshwater bacteria thrive in levels of salinity ranging from 0-6 ppt, saltwater nitrifying bacteria in these families thrive in salinity levels of 6-44 ppt.

Dissolved oxygen levels within beds for saltwater applications should be maintained to the same levels as in freshwater applications to facilitate the colonization of microbes for the oxidation of ammonia to nitrite and nitrate. Without maintaining proper oxygen levels, the ammonia becomes nitrogen gas which nitrogen fixing bacteria use to form toxic hydrogen sulfide.

Figure 6:
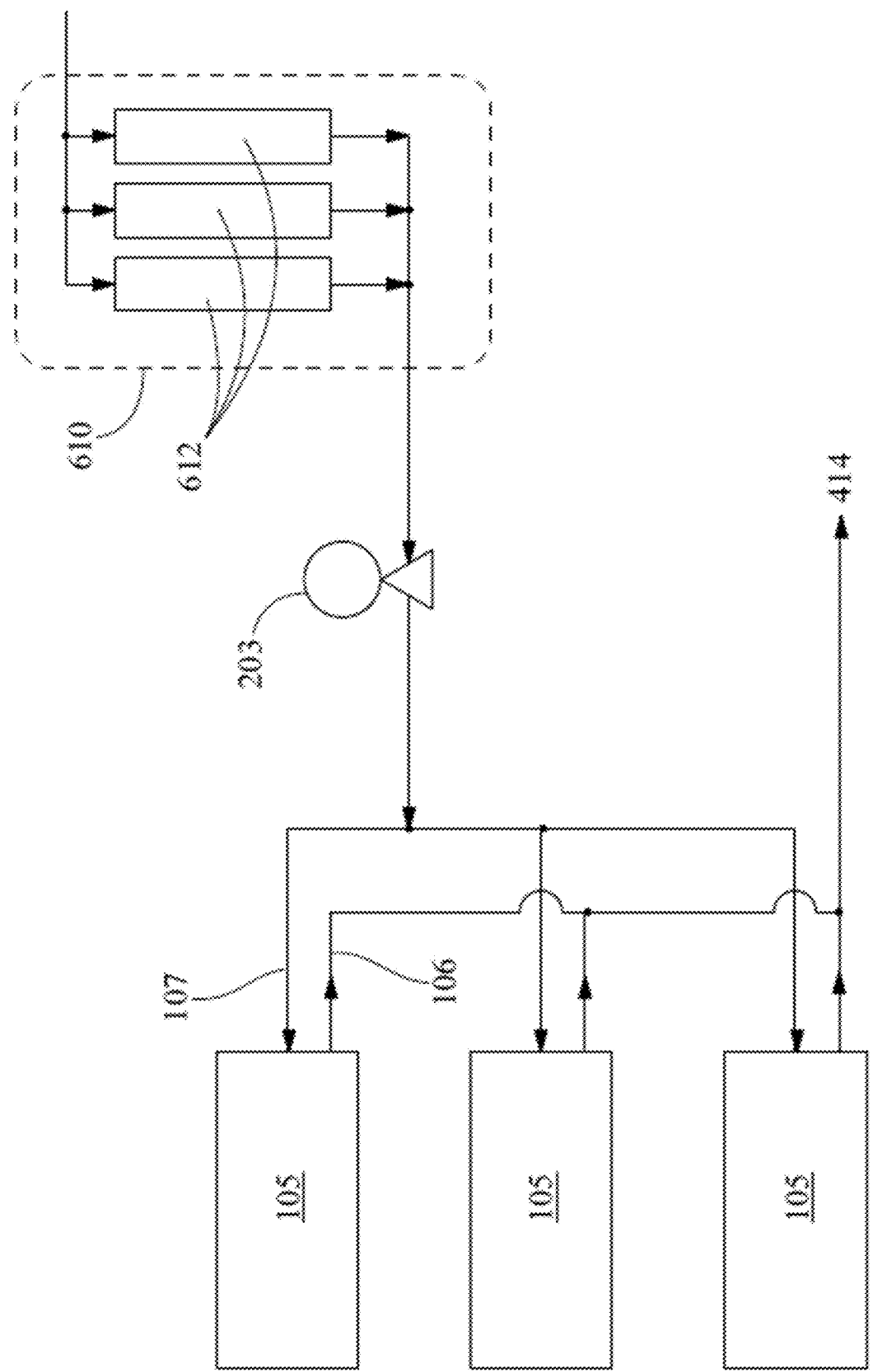
FIG. 6 schematically illustrates an embodiment of a waste treatment system for the remediation of water from an aquaculture facility.

FIG. 6 shows yet another embodiment in which the source of the waste stream is the effluent of an aquaculture facility 610 that uses aquaculture raceways 612 that employ a constant flow-through of fresh water, such as those found in many trout farm environments, for example. As illustrated, the aggregate flow leaving the aquaculture facility 610 is passed through the media beds 105 for remediation. While the remediated water may be re-circulated for additional embodiments, the media beds 105 described herein have been demonstrated to accomplish sufficient remediation in a single pass such that the remediated water is suitable for discharge 414 back into the environment. It will be appreciated that not all aquaculture facilities 610 use raceways and that regardless of whether the aquaculture facility uses raceways, tanks, or some combination thereof, the discharged water may be recirculated back to the aquaculture facility 610. In the case of a raceway set up, the water may be re-introduced upstream of the raceways 612.

Figure 7:
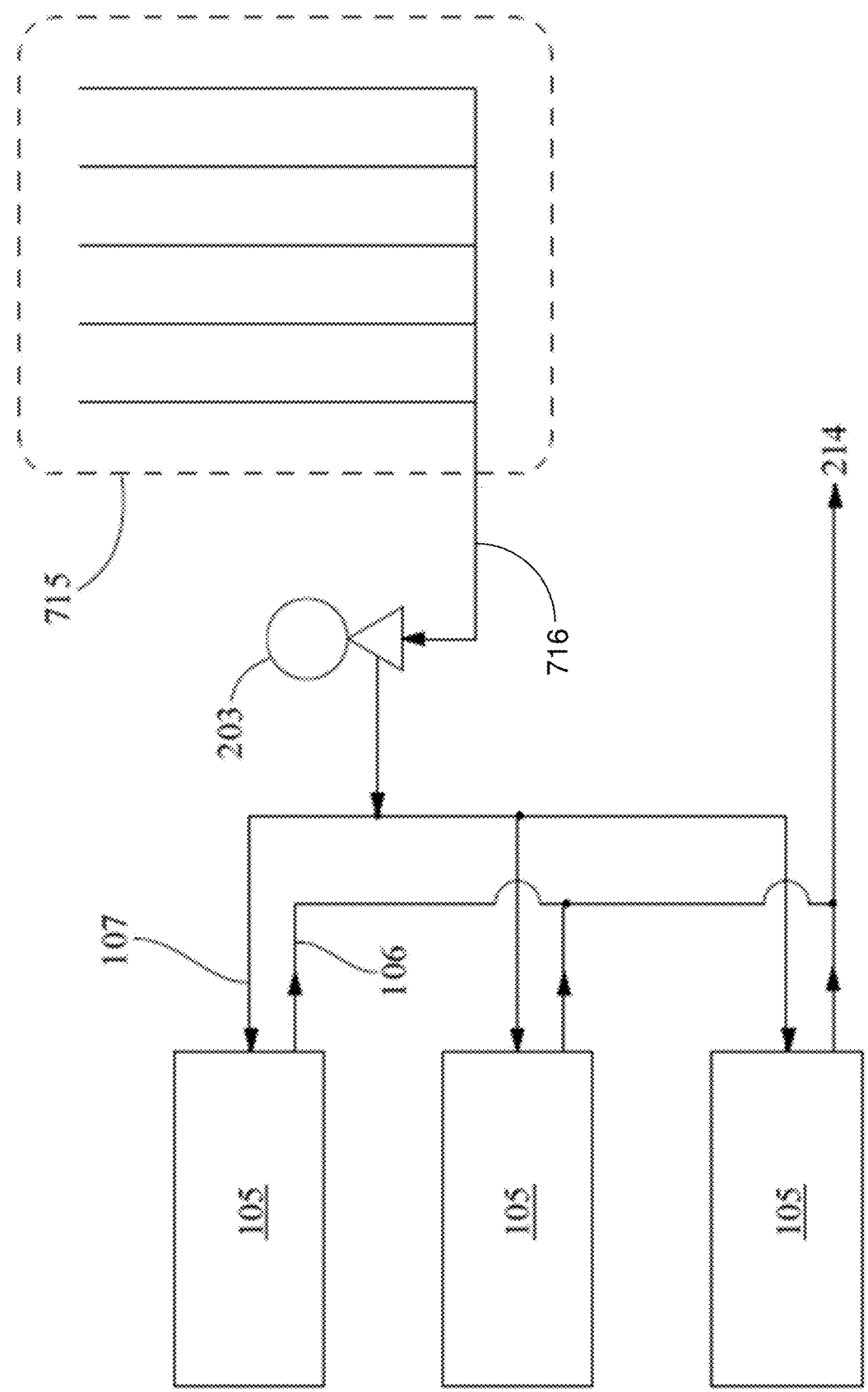
FIG. 7 schematically illustrates an embodiment of a waste treatment system for the remediation of run-off water from an agricultural field.

FIG. 7 schematically illustrates yet another application for exemplary embodiments in which an agricultural field 715 having tile-drainage or other collection means resulting in waste-rich run-off that is collected at a system outlet 716 and directed by one or more pumps 203 to the media beds 105 for remediation. In embodiments in which the source of the waste stream is agriculture field run-off, it may be desirable to use a settling tank or other vessel (not shown) to prevent introducing excess amounts of soil into the media bed(s) 105.

Accordingly, embodiments of the present invention allow for the safe processing of a variety of solid and liquid biological wastes from a host of agricultural sources. Furthermore, exemplary embodiments can be constructed in a manner that is easy to operate and energy efficient.

In some embodiments, a waste treatment system or an aquaponics system 100 includes a fish tank 101, a separating tank 102, and a media bed 105 that are fluidly connected in a continuous manner. The system 100 is a closed system without discharge to surroundings as part of regular operations, thereby providing a true zero-discharge system.

The fish tank 101 may be any kind of tank or pool and contains fish or other cultured aquatic life in a life-sustaining liquid, typically fresh-water. The fish tank may further include liquid waste and solid wastes excreted by the fish.

The fluid, including waste product, flows from the fish tank 101 to the separating tank 102. The separating tank 102 may be any suitable separation apparatus to separate solid wastes from the liquid. Suitable apparatus for the separating tank includes, but is not limited to, sand filters, bead filters, baffled clarifiers, membrane filters, settling tanks, or combinations thereof. In some embodiments, the separating tank 102 is a collection tank or a settling tank, in which solids fall out of the liquid by gravity.

The separated solids or solid wastes may be directly delivered to the media bed 105. Similarly, the separated liquid i.e., water containing ammonia and other liquid waste (as well as small amounts of suspended solid waste) may also be directed to the media bed 105. Alternatively, in one embodiment, as illustrated in FIG. 1, the separated liquid may first be directed to one or more bioreactor(s) 103 and 104. In either case, the separated solids and separated liquids each undergo further treatment to oxidize the waste in each stream, such as converting ammonia to nitrite, and nitrite to nitrate in the liquid stream.

In one embodiment, a first bioreactor 103 may contain bacteria that convert ammonia to nitrite including, but not limited to, *Nitrosomonas, Nitrosospira, Nitrosococcus*, and *Nitrosolobusand*, while a second bioreactor 104 may receive flow from the first bioreactor 103 and contain bacteria that convert nitrite to nitrate, including, but not limited to, *Nitrobacter, Nitrospina*, and *Nitrococcus*. In some embodiments, bioreactor 103 may contain *Nitrosomonas*, and Bioreactor 104 may contain *Nitrobacter*. In some embodiments, bioreactors 103 and 104 may include at least two kinds of bacteria. In an embodiment, bacteria in 103 may be the same kind as bacteria in 104. In another embodiment, bacteria 103 may be dissimilar to bacteria in 104.

Although shown as two separate vessels to form two separate bioreactors, it will be appreciated that a single bioreactor may be employed with both classes of bacteria (those converting from ammonia to nitrite and those converting from nitrite to nitrate) both present in the same bioreactor. Likewise, it will further be appreciated that more than two bioreactors may be employed in series. The number of bioreactors may depend in part on the levels of impurity contained in the fluid as well as the size of the bioreactor, which may be provided as any vessel that can contain a suitable volume of liquid to host the bacteria.

In some embodiments, the bioreactors may include a large volume of net-like elements such as net, wire, grid, guide wire grid, or combinations thereof, providing high surface area to facilitate bacteria growth. Different types of net-like elements may be used for each bioreactor, depending on the kind of bacteria contained in it.

As illustrated, ammonia in the liquid leaving the separating tank 102 is converted to nitrite in the bioreactor 103, and formed nitrite is converted to nitrate in turn in the bioreactor 104. A high conversion of ammonia to nitrate is desired because plants (such as those grown in the media bed) consume only nitrates, while ammonia and nitrite are harmful to most plant life.

From the bioreactor(s), the water, now rich in nitrates, flows to the media bed 105. The media bed 105 generally includes one or more types of non-soil media that can support the plant life used in the system to accomplish nutrient uptake. Suitable media includes, but is not limited to, activated carbon, granular activated carbon (GAC), pelletized activated carbon, polymeric fibers, crushed stone, pumice, sand, plastic media, gravel, and combinations thereof.

As with the cultivation of fish-life in the fish tank 101, a wide variety of plants may be cultivated in the media bed 105. The cultivation of plants results in the uptake of nitrates and other nutrients resulting from the oxidation of the fish waste. Thus, exemplary embodiments achieve a balance of removing fish waste that would be harmful to plants by converting it into nitrates, while the plants remove the nitrates that would be harmful to the fish. The resulting system, by efficiently eliminating both solid and liquid waste at high conversion rates, results in a closed, zero-discharge system that does not require any regular, periodic flushing to remove build-up of excess waste or nutrients.

Plants may be grown directly in the media bed 105. Alternatively, or in addition to plant life cultivated in the media bed, the nutrient rich water containing nitrates and other oxidized waste may also be used with one or more other vessels fluidly connected to the media bed as part of the closed system configured to support plant life. Any suitable vessel or other arrangement that does not interfere with the closed nature of the system may be employed for additional plant cultivation. Exemplary arrangements include, but are not limited to, float beds, towers, nutrient film technology (NFT) and ponds.

According to an exemplary embodiment, the media bed 105 further includes the presence of worms cultivated in the media bed.

The presence of annelid worms in the media bed 105 accomplishes several tasks. The worms in the bed continuously break down incoming solid waste delivered from the separating tank 102, helping to prevent the accumulation of solid waste in the media. This helps ensure that water easily passes through the media, and reduces the chances for clogging. Additionally, the worms create passages in the media for the movement of air throughout the bed so that all portions of the beds can contain high enough levels of dissolved oxygen to decrease the potential for anaerobic zones in the beds.

The presence of annelid worms in the media bed(s) also has the advantage of chelation of nutrients. Much of the nutrients in incoming solid waste is not chelated and is, therefore, not water soluble. As the annelid worms break down the incoming solid waste and pass it through their digestive tract, the nutrients are chelated, making them water soluble, and therefore more readily available for uptake and use by plants growing in the media bed.

In another embodiment, the media bed 105 is the subject of active aeration. Active aeration may be performed by any suitable mechanism, including, for example, a regenerative blower, air pump, compressor, other mechanical equipment, or combinations thereof. The aeration allows for controlling the dissolved oxygen in the media bed 105. The active aeration helps prevent the beds from developing anaerobic areas that are harmful to fish health and plant growth.

It will be appreciated that in embodiments in which the media bed is sufficiently aerated, aerobic ammonia- and nitrate-converting bacteria may be cultured directly in the media bed, thriving to perform their function of converting liquid waste to nutrients without the need to employ any additional vessels to act as separate bio-reactor(s).

Active aeration also aids in the safety of worm populations and surprisingly allows them to survive in a water rich environment. Additionally, active aeration decreases the incidences of various plant root infections and diseases.

Exemplary embodiments preferably employ the use of media beds 105 of the continuous flow type. In comparison to passively aerated, ebb-flow systems, the use of a continuous flow bed decreases the incidence of clogging in the bed, as the stones or other media remain sufficiently wetted to decrease the accumulation of algae and bacteria on the stones. This continuous movement further aids in decreasing the development of anaerobic areas in the beds.

Turning to FIG. 2, a more detailed portion 106 of the system 100 surrounding the media bed 105 is shown. A pump 203 is in communication with an incoming waste stream 107 which is either a solid waste stream released from the separating tank 102, a flow of water containing the liquid leaving the bioreactor 104, or a combined flow. Supply of the waste stream to the pump is preferably and advantageously controlled by a single valve 202. Similarly, the operation of the pump 203 may also be controlled by a single switch 204. Generally, the valve is positioned so that the waste stream 107 is flowing from the second bioreactor 104, with periodic operation to feed accumulated solid waste from the separating tank 102 (with which will also flow some incoming liquid from the separating tank).

The pump 203 delivers the incoming waste stream into the media bed 105 at the waste inlet 107 via the supply manifold 206. To aid in clean, ongoing operation of the system, cleanout valves 208 may be located on each supply manifold 206. As the pump 203 delivers the solid waste and associated liquid to the bed, the solid waste is deposited in the media, filtering the associated liquid, while nutrients in the liquid are absorbed by the plant life in the media bed 105. The filtered liquid is displaced back into the fish tank 101 through a drain line (e.g., treated waste outlet conduit 207), eliminating the need for discharging waste from the closed system.

The present invention may also comprise a method of treating a solid and liquid waste in an aquaponics system 100. In an embodiment, the method includes the step of providing a fish tank 101 containing a fluid, a separating tank 102, and a media bed 105.

The method further includes the step of delivering the fluid in the fish tank 101 to the separating tank 102. The separating tank 102 separates the fluid into solids and liquids. In one embodiment, the separating tank 102 delivers the solids to the media bed 105, and the liquids to the bioreactors 103 and 104. Bacteria in the bioreactor 103, such as *Nitrosomonas, Nitrosospira, Nitrosococcus*, and *Nitrosolobus*, convert ammonia in the liquids to nitrite. Bacteria in the bioreactor 104, such as *Nitrobacter, Nitrospina*, and *Nitrococcus*, convert nitrite into nitrate. In one embodiment, nitrate-rich liquids are delivered to the media bed 105 although conversion to nitrate may also occur directly in the media bed as previously described. Nitrate-rich liquids and the solids may form a mixed stream before they are delivered to the media bed 105. The media bed 105 filters the solids and nitrate-rich liquids, nitrates absorbed by cultivated plant life, and filtered liquid is then returned back to the fish tank 101.

The media beds, apparatus and systems described herein provide a sustainable living ecosystem never before achieved, where submerged worms, microbes and plants can thrive and biodegrade large quantities of aqueous or oxidizable waste. The media beds, apparatus and systems described herein also provide for many advantages and increased efficiency over prior art methods. For example the media beds, apparatus and systems herein prevent clogging. Traditional biomediation systems systems are particularly susceptible to clogging over time. They require periodic backflushing to maintain flow, periodic excavation to remove carbonaceous wastes by physical removal, or cleaning to remove by oxidizing carbonaceous waste build up. This type of maintenance is costly, often due to labor costs, reduces the time that a system can be active.

The media beds, apparatus and systems described herein eliminates this labor and down-time cost. In some embodiments, a media bed, apparatus or system described herein can be operated continuously for more than a year without down time, and without requiring removal of solid waste build up or cleaning. During this time the media bed, apparatus or system can maintain amounts of nitrifying bacteria required to remediate all the ammonia wastes generated by and introduced into the system, and maintained the worm population through reproduction. By comparison, vermicomposting (on land) fails to remediate all of the ammonia waste, much of the nitrogen is ejected into the atmosphere as N2 gas and nitrates (plant nutrients) are derived from worm castings alone. Systems, media beds and apparatuses described herein maintain continuous aerobic conditions and ultimately returns almost all of the nitrogen as nitrate, a plant nutrient. This is due to aerobic nitrifying microbes converting ammonia to nitrate. In systems described herein nitrate is produced in the water at approximately 350 ppm, but the concentration can be varied from zero to greater than 1000 ppm based on waste loading to the system. Worm castings alone have very low N concentrations (1.8%) and it would require dissolving 33.3 kg of worm castings in 2000 L water per day to give a nitrate concentration 350 ppm. Therefore a system described herein also provides a major savings in nitrate provision compared to deriving the nitrate from worm castings alone. Our media bed systems, by including nitrifying bacteria that oxidize ammonia and provide a primary nitrate source, and worms that keep the system from clogging, is much more efficient than either alone.

Traditional biofilters using nitrifying bacteria fixed to the media without worms have ammonia reduction rates that vary strongly with surface area of the media; the smaller the media the higher the surface area and the higher the nitrification rate. However hydraulic flow declines with media size making the filter less efficient at passing water through it. Further, these filters require backflushing as they clog with dead bacteria, and the inevitable carbon rich wastes that comes with them, and must be cleaned or backflushed. Therefore these biofilters are seldom used at a large scale or for waste streams that have not had the biosolids removed in some other fashion. The efficiency of such filters at removing ammonia from waste streams declines by 70% at C:N ratio as low as 1.0-2.0. The media beds described herein do not decline in efficiency of ammonia removal at C:N ratios as high as 25:1 with sufficient dissolved oxygen because the worms consume the organic carbon, supply additional ammonia to the water from their respiration (which enhances activity of nitrifying bacteria), enhance the heterotrophic microbial activity of the whole system by exudates, polysaccharide slime, and enzymes, and reduce the overall system population of heterotrophic bacteria by eating them. The ingesting and consumption of heterotrophic bacteria not only keeps the beds from clogging, it greatly reduces their number. This reduction in number is important as heterotrophic bacteria used in waste treatment can increase their populations five times faster than nitrifying bacteria, greatly limiting their efficacy in nitrification. In one example, a media bed system can biodegrades 10 kilos of dried, solid, pelleted chicken waste producing ammonia levels of 26 ppm of ammonia (6 ppm Nitrate) thereby reducing ammonia levels to 0.0 ppm and nitrates to greater than 1000 ppm in six days.

Additionally, the media beds, apparatus and systems presented herein prevent formation and subsequent release of methane and reduces the contribution of organic waste and manure digestion to global climate change. Accordingly, the media beds, apparatus and systems present herein allow for the safe and efficient processing of solid and liquid ammonia waste from aquaculture systems. Furthermore, the present invention is easy to operate, and is energy efficient.

Methods

In some embodiments, presented herein is a method of treating waste comprising (a) providing a media bed comprising a biomass, wherein the biomass comprises water and worms, the worms are submerged in the water, and the water comprises an oxygen content of at least 3 ppm; and (b) contacting the biomass with oxidizable waste, thereby forming a mixture. In certain embodiments, a method further comprises (c) removing a portion of the mixture, wherein the portion of the mixture comprises treated waste. In some embodiments, the water further comprises un-ionized ammonia at an amount of 5 ppm or less, or 0.5 ppm or less. In some embodiments, the media bed and/or biomass comprises oxidizable waste. In some embodiments, the media bed comprises media.

In some embodiments, the contacting of (a) and the removing of (c) comprises continually introducing the oxidizable waste into the media bed while continually removing a portion of the mixture there providing a constant stream or current through the media bed.

In certain embodiments, the method further comprises aerating or oxygenating the media bed, water or biomass to an dissolved oxygen concentration of at least 3 ppm, at least 3.1 ppm, 3.2 at least ppm, at least 3.3 ppm, at least 3.4 ppm, at least 3.5 ppm, at least 3.6 ppm, at least 3.7 ppm, at least 3.8 ppm, at least 3.9 ppm or at least 4.0 ppm.

In some embodiments, the method comprises generating a horizontal flow of the aqueous waste stream (oxidizable waste) through the media bed. Continuous or often repeated horizontal flow through the media bed avoids formation of anoxic pockets where bacteria that generate toxic hydrogen sulfide form. It also avoids formation of filamentous bacteria that will clog the media and disperses wastes evenly throughout the media bed. In certain embodiments, a media bed is not be allowed to dry out or fully drain. In some embodiments, a media bed or biomass is continuously aerated.

In some embodiments, keeping a media bed aerobic by aeration avoids the gasification of nitrogen as N2 gas in anaerobic environments. In some embodiments, a media bed is continuously aerated from beneath by a perforated pipe, hose or air stones. In some embodiments, ambient air is used for aeration. In some embodiments, aeration or oxygenation comprises introducing oxygen gas from tanks, or oxygen produced by gasified liquid oxygen, into a media bed or biomass. In certain embodiments, aeration is applied at a rate to maintain dissolved oxygen at a concentration of at least ≥3.0 ppm. While some fish, earthworms and many microbes can tolerate dissolved oxygen below this level, 3.0 ppm is often a lower threshold for microbial conversion of ammonia to nitrite. If dissolved oxygen goes below 3 ppm, ammonia often builds rapidly and becomes toxic to living organisms in the system. If dissolved oxygen drops below 0.5 ppm the earthworms will leave the system if at all possible. Further, dissolved oxygen ≥3.0 ppm aerates plant roots and thus allows for cultivation of plants, both aquatic and terrestrial, directly in the media beds.

EXAMPLES

Example 1

FIG. 3 shows an embodiment of a media bed 105 prior to the introduction of media, water, and other bed contents. Waste enters the media bed 105 via the waste inlet 107 which in the illustrated embodiment distributes the waste on either side of the bed via waste inlet manifolds 206, which may be a continuation of the waste inlet conduit having holes along the length of the bed for the waste to escape into the bed. The waste manifolds 206 also optionally include valves 208 positioned to be accessible above the media and which may aid in servicing any clogs that might occur within the manifolds 206. In some embodiments employing a continuous flow arrangement, an additional water inlet 26 may optionally be provided to maintain a constant volume of water flow by introducing water free of solid wastes (for example, overflow from a fish tank in the context of an aquaponics system). The use of an additional water inlet 26 may be particularly advantageous for embodiments in which solid wastes are periodically introduced to the media bed 105 under pressure via the manifolds 206.

While the embodiment in FIG. 3 shows the waste input 107 and waste manifold 206 constructed of rigid PVC, these components, as well as other plumbing components within the invention can be constructed of a variety of materials, including but not limited to polypropylene, polyethylene, reinforced rubber hose, metal piping, etc. In one embodiment, the interior plumbing components are constructed of reinforced flexible rubber hose. This may help reduce the possibility of damage due to freezing water, shifting of the media bed 105 or its contents, plant root growth, or other potential problems.

Remediated water leaves the media bed via the treated waste outlet 106. The remediated water is collected by a perforated drain pipe (e.g., treated waste outlet conduit 207). An overflow drain 28 may also be connected to the treated waste outlet 106; the overflow drain 28 protects the media bed 105 from overflowing should there be a clog in the outlet conduit 207.

In some embodiments, the waste inlet 107 is situated at a predetermined height above the outlet. It will be appreciated that the greater the distance between the waste inlet and outlet, the greater the distance that the water passes through the media, which may reduce the number of cycles water needs to be circulated before the desired level of remediation is achieved.

In some embodiments, the media bed 105 includes microbes (i.e. bacteria and archaea) that convert ammonia to nitrite, as well as those that convert from nitrite to nitrate. The carbon dioxide gas in the waste water and carbon compounds in the solid and liquid waste stream aid this process by providing carbon sources for biomass construction to the bacteria, particularly those involved in the oxidation of ammonia.

Active aeration is used in the media bed 105 such that the water surrounding the worms is oxygenated to 3.0 ppm dissolved oxygen or greater. Thus, because the media bed is flooded with water and the worms may thus spend much or even all of their time in the media bed completely submerged in water, the oxygen content is maintained at such a high level that worms, including ordinarily terrestrial earthworms, can nonetheless still breathe. Because the media bed and the water within it is rich in waste, the worms have a sufficient supply of available food that also sustains life. Although the worms can withstand periodic short term conditions of lower dissolved oxygen, the bacteria that oxidize ammonia to nitrite generally cannot and constant aeration is thus generally desired. The presence of bacteria within the media bed helps control ammonia levels and the ammonia levels in the media bed should be less than 5 ppm un-ionized ammonia, such as less than 1 ppm un-ionized ammonia and in some embodiments the media bed contains about 0.7 ppm or less of un-ionized ammonia.

With the dissolved oxygen, the worms in media beds in accordance with exemplary embodiments are capable of obtaining enough oxygen through their skin to survive, eat, and even reproduce despite the media bed being flooded with liquid water.

Conventional media beds without worms eventually build up bacteria and wastes and cease to function; they are prone to clogging, the formation of anaerobic zones, and potentially producing methane and hydrogen sulfide, which are highly toxic to fish. These bioproducts have been a serious problem limiting use of media beds in aquaponics systems. The presence of annelid oligochaete worms in the media bed 105 in accordance with exemplary embodiments accomplishes several tasks and overcomes problems in conventional media beds.

As previously noted, it will be appreciated that because the media bed is sufficiently aerated, aerobic ammonia- and nitrite-converting microbes may be cultured directly in the media bed, thriving to perform their function of converting liquid waste to nutrients without the need to employ any additional vessels to act as separate bioreactor(s) upstream of the media bed.

In comparison to passively aerated, ebb-flow systems, the use of a continuously flooded media bed decreases the incidence of clogging in the bed, as the stones or other media remain sufficiently wet to decrease the accumulation of filamentous algae and bacteria on the stones. This continuous movement further aids in decreasing the development of anaerobic areas in the beds. These media beds may also be used with periodic wastewater flow, provided that the oxygen and moisture levels are maintained within the media bed sufficient to sustain the bacteria and worms between and during periodic flow.

Example 2

Figure 8:
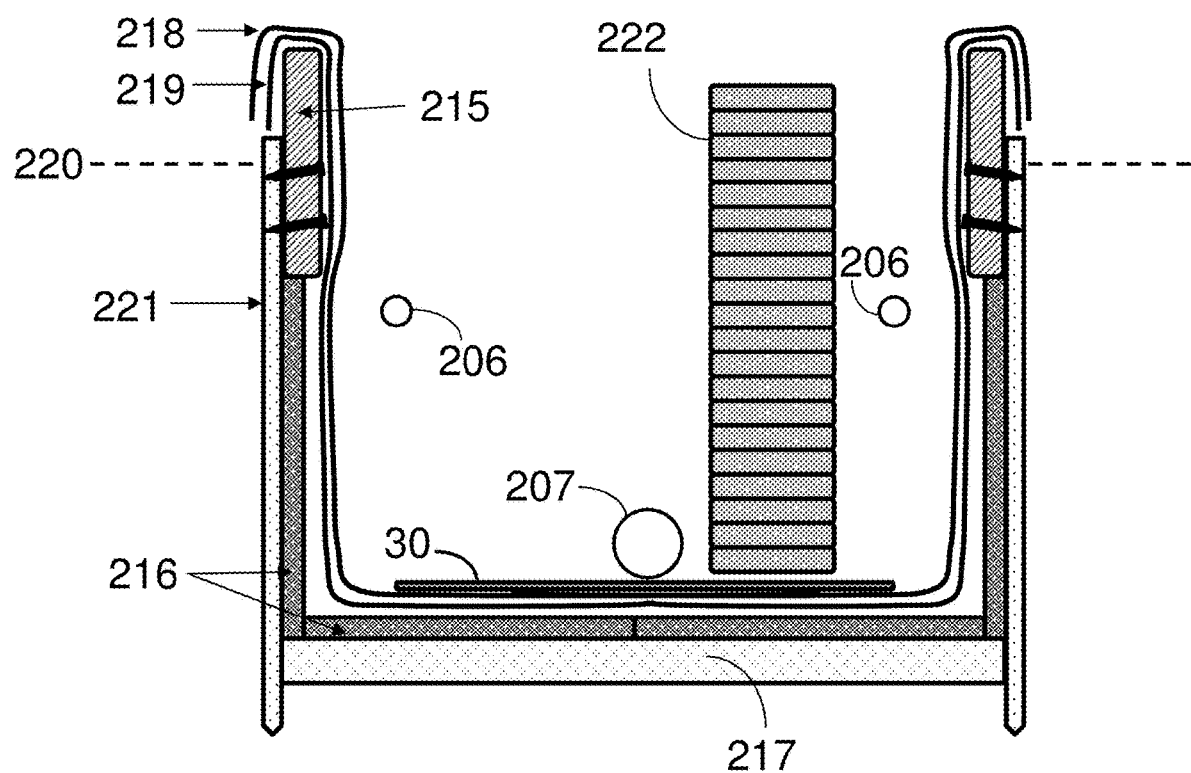
FIG. 8 shows a cross section of an embodiment of a media bed.

In one embodiment, the media bed is constructed as a lined earthen pool (e.g., see FIG. 8). This embodiment allows for the rapid, economic deployment of beds in a wide range of locations. While the dimensions of this type of bed can vary greatly, in some embodiments the bed is constructed with a width in a range of about 2 feet to about 8 feet wide. In some embodiments, the depth of the bed is in a range of about 1 foot deep to about 8 feet deep. The length of a bed can vary greatly. It should be noted that the above dimensions of width are to establish optimal distances between the waste input lines (206) and the outlet conduit (207). In embodiments where a larger containment basin is desired, such as in the creation of a more natural appearing constructed wetland, multiple sets of waste input lines and collection lines can be utilized in parallel.

When a desired location has be selected for the installation of a media bed, the land should be cleared of debris and leveled. The total area of the earth excavated is determined by the desired exterior dimensions of the bed being constructed. This is calculated by adding the wall dimensions of the beds to the desired interior dimensions. The width of the side walls will vary depending on the material utilized. For example, in this embodiment, pressure-treated 2×12 lumber was used to construct the supporting edge of the beds (215). The thickness of these boards was calculated into the overall dimensions of the beds. The desired dimensions should be clearly marked on the ground, and the earth within those dimensions should be excavated.

The depth of the beds will be determined by the desired internal depth of the bed, plus the depth of any necessary barrier between the liner and the earth below. Depending on the composition of the ground in which the bed is placed, it may be necessary to place a layer of protective foam board (216), or a layer of sand (217) on the bottom of the excavated ground prior to placing the liner (218) in order to protect the liner from sharp stones or other debris. Protective materials such as liner felt (219) can be utilized as well to ensure a safe barrier between the liner and ground below. Once the proper excavation has occurred, it is important to ensure that any stones or other debris be removed from the bottom and side walls of the hole.

Depending on the intended use of the media bed, it may be necessary to install a buried sump in front of the media bed. This sump will be used for dosing waste into the bed, and will also aid in recirculation of the wastewater through the bed, and the collection of water from the bed. The sump should be sized appropriately based off the sized of the bed, the intended outcome of the waste, the waste input being process, local ground temperatures, and other factors. It is important that the usable volume of the sump tank be at a lower elevation than the stable water level of the media bed during operation.

For example, in this embodiment, the water level in the bed is 2 inches below ground level (220). Therefore, a 48-inch tank, buried so that the access lid is 4 inches above ground level will require a 44-inch hole be excavated. While this may be a 480-gallon tank by volume (i.e., about 1817 liters), only the bottom 42 inches of tank are below the standing water level of the media bed, giving the tank a usable capacity of only 420 gallons (e.g., about 1590 liters). For ease of use and ongoing maintenance of the system. It is suggested that the sump tank be buried inside of a concrete sleeve. This allows the tank to be easily removed to be serviced or replaced without requiring further excavation in the future.

A hole sized appropriately to house the tank and optional concrete sleeve should be excavated at the front end of the media bed hole. A trench should be dug at the elevation of the bottom of the media bed hole connecting the two holes. Depending on the composition of the ground in which the tank will be set, it may be necessary to dig the tank hole deep enough to allow for pavers, sand, or a stone bottom to be added to the hole to ensure that the bottom of the tank sits level and secure. The concrete liner and tank can be safely lowered into the hole. The trench between the tank and the bed should remain open until the final plumbing is complete.

If a foam (216) or sand bottom (217) is utilized in a media bed to protect the liner, it should be installed at this point. In this embodiment, 2-inch structural foam is cut to the inside dimensions of the bottom of the hole. The pieces of foam are taped together to keep them from shifting as the liner is installed. If foam will be used to protect the side walls of the liner, it will be installed after the structural top edge.

A structural top edge can be added to the bed at this point. The structural top edge helps to maintain an elevated, defined line between the ground outside the beds, and the media inside the bed. This top edge can be constructed from a wide variety of materials as either an affixed wall or lumber, metal, or foam, or even a berm of earth, stone, or masonry.

If a lumber structural top edge (215) is used on the bed, 1×1 stakes (221) should be hammered into the ground into the bottom of the hole around the perimeter of the bed. The stakes should be long enough that they are sufficiently supported in the ground, and the top of the stake sits at least 6 inches above will act as supports on which to mount the 2×12 top edges of the bed.

Using a transit, or other level, mark each stake 6 inches below the common ground level (220) outside the bed. A transit should be used to ensure that regardless of fluctuations in the ground level outside the bed, that the marks on the stakes are at the same elevation. This is key to ensuring that the top of the bed is straight and level.

The 2×12 lumber (215) should be affixed to the stakes (221) so that the bottom of the board rests on the 6-inch marks. This will center the board approximately at ground level, leaving a 6-inch lip extended above ground level.

If foam board or other material is to be used to provide a protective barrier between the liner and the sides of the trench, it should be installed at the point. Material can easily be affixed to the upright stakes in a similar fashion to the top lumber. If a protective liner blanket is to be installed, it can be careful laid into the trench, folded in the corners, and wrapped up and over the top edge boards. Note that it should not be secured into place or cut to final fit at this point as it may shift or settle when the bed is filled with water of media. The blanket and liner should both be free to move and settle during the filling process.

When the top edge is installed, and any protective measures have been put into place, the liner (218) can be carefully laid into the bottom of the trench. The corners of the liner should be folded to allow it to settle into the corners of the trench. It is not critical that the liner be fitted perfectly into place or secured to the top edge at this point. In the bottom of the front-end wall of the trench, cut a hole in the liner sized to receive a bulkhead of the necessary size for the amount of water flow through the bed. In this embodiment, a 3-inch hole is cut to receive a 2-inch ABS bulkhead (223). A 6×6-inch square of 1-inch pressure treated lumber (224) is used as a large washer against which to pin the liner (218) to the bulkhead fitting. If a protective blanket (219) is used on the bed, the bulkhead will pass through the protective blanket in the same fashion as the liner.

When the bulkhead is fitted into place, use it as a guide to determine the elevation of the through hole in the sump tank and concrete sleeve. Drill a hole through the concrete sleeve and sump tank (230) size appropriately for the plumbing used to connect the bulkhead and sump tank. In this embodiment, a 3-inch hole is drilled to accept a 2-inch uniseal fitting (231). The Uniseal is installed from the inside of the tank, and a beveled 2-inch pipe (232) is pushed through the uniseal to the midpoint of the trench between the tank and the front wall of the bed where the bulkhead fitting it located. The pipe should long enough that the pipe sticks out toward the middle of the sump tank. On the end of the pipe inside the sump tank, a tee (233) is connected into place and fitted with a cleanout port (234). A vertical standpipe (235) is added that will be used to set the final running height of the water within the bed.

Another section of pipe (232) is fitted into the exterior side of the bulkhead. This pipe should be long enough to reach other sections of pipe coming from the tank, which can be connected with a solid or rubber coupling.

On the side of the bulkhead inside the bed, a small section of pipe (225) should be installed into the bulkhead, leaving enough room to securely affix a tee (226) with the side port facing vertically. A vertical standpipe (227) should be affixed into the tee (226). This standpipe should be long enough to extend approximately 1 inch above the final level of the media in the bed. This standpipe serves as an overflow in the event that the main drainage line becomes clogged or damaged, ensuring that incoming water from the sump tank does not overflow out of the bed.

Another small section of pipe (228) is secured into the tee, on which a large adapter (229) is affixed to connect the bulkhead drainage plumbing to the main discharge line. In this embodiment, a 4-inch flexible, perforated drain line (e.g., outlet conduit 207) was used, requiring a 2-inch by 4-inch adapter be installed. This drain line is run alone the bottom middle of the bed. At the far end of the bed, the drain line continues up the back wall, extending up past the level of the media in the bed. Once the media is installed in the bed, this drain line will be cut down to the level of the gravel, and a screen will be fitted to ensure nothing falls into the line. This allows for a simple access port into the drain line, useful for future servicing or cleaning.

After the drain line is laid along the bottom of the bed, aeration lines should be added. Any method of aeration that can achieve the necessary dissolved oxygen requirements of the bed can be utilized. In this embodiment, ⅜th inch soaker hose (30) is connected to a PVC supply manifold. The manifold is a 1-inch PVC pipe fitted with two male adapters capable of receiving standard hose fittings. The PVC manifold is placed vertically at the midpoint of the media bed, next to the drain pipe. The top of the manifold should extend above the final gravel level of the bed.

The soaker hose is laid in a curved zig-zag patter under the drain pipe the entire length of the bed, each hose covering half of the bed. The soaker hose and drain line can be held into position by adding a layer of media into the bed as the hose is laid out. Prior to fully covering the bottom of the bed with media, pump out accesses can be installed to make draining the bed easier should it become necessary. In this embodiment, one section of 10-inch diameter drain (222) pipe was placed vertically at each end of the bed. These sections of pipe should be long enough that they sit resting just above the bottom of the beds, and extend above the final level of the media. These pipes provide locations to pump water out of the bed should it become necessary to service or winterize the bed.

At this point, a few inches of water can be added to the system to help position the liner into the edged of the bed. As water and media are added to the bed, the outside of the liner and bed can be backfilled if necessary. This will ensure that similar pressure is put on the inside and outside of the liner as it fills, decrease the risk of stretching the liner. Water and media can continue to be added until the bed is filled approximately 10 inches from the final media level. This depth can vary due to the specific parameters of the bed being constructed, the waste being processed, and the architecture of the plants being cultivated in the beds. At his point, the wastewater inlet lines (249) will be installed.

While the waste input lines can be constructed of a wide range of materials, in this embodiment, 1.5-inch reinforced tubing is utilized to minimize the fittings present, protecting against damage from shifting media and freezing water. The waste inlet tubing (249) is perforated with ¼th inch holes (250) every ten inches along the entire length. The tubing is cut long enough that it can be placed along the entire length of the beds, approximately 6 inches from the side walls, while extended above the level of the media at both ends of the bed. When working with the tubing in the beds, tape off the open ends to ensure that no debris falls into the lines. When the lines have been laid into place, continue adding media until the beds are filled to their necessary depth.

After all the media has been added to the beds, it is safe to secure the liner to the top end rail if one is being utilized. The liner can be cut down to a manageable size, ensuring that enough liner remains to fold it tightly over the top edge rail. By carefully folding the corners, the liner can be made to lay cleanly over the rails. After wrapping the liner over the rails, it can be secured using a variety of fasteners including but not limited to screws with washers, staples, or tacks. The liners can be buried slightly around the rails to aid in aesthetics. If a top rail is not being utilized, the liner can be cut to lay flat along the edge of the bed. If a berm-style edge is being used, the berm can be constructed along the edge of the bed, above ground level. The liner should be wrapped over the top of the berm and affixed securely.

Once the bed is filled, the air manifold can be cut down and affixed to an air source suitable to maintain a dissolved oxygen level of at least 3 ppm, such as but not limited to a regenerative blower, air pump, oxygen delivery system, or compressor.

The ends of the inlet pipes furthest from the sump should be fitted with ball valves (236). These valves should remain closed during normal operation, and are used to purge clogs and provide an access point into the supply manifolds for cleaning and servicing. In this embodiment, 1.5-inch threaded ball valves (236) were connected to 1.5-inch barbed male adapters (237). These barbed fittings were inserted into the tubing and secured with metal hose clamps (238).

The supply end of the inlet lines, located near the sump tank, are connected into a single manifold. In this embodiment, 1.5-inch barbed male adapters (239) are inserted into the tubes and secured with metal hose clamps (240). 1.5-inch PVC female adapters (241) convert the tubing to PVC. Two 1.5-inch 90-degree elbows (242), and a 1.5-inch tee (243) are used to create a single manifold with an input port. This manifold is connected to the circulating pump. A ball valve (244) is in place between the pump (245) and the manifold to provide control over the flow of water entering the bed. In this embodiment, a 1.5 hp, self-priming pump is used to lift wastewater from the sump tank, and deliver it through the input tubes. The inlet of the pump is a long 1.5-inch pipe (246) fitted to a 90-degree elbow (247). The bottom of this straw-like structure draws wastewater off the bottom of the tank. The bottom of the inlet pipe sits 1 inch off the floor of the sump tank.

In an ideal embodiment, a small port (251) is added to the waste inlet pipe supply manifold. A valve-controlled hose (252) takes a portion of water from the manifold, and returns it to the bottom of the sump tank in a manner that creates a swirling effect in the tank (253). This ensure that solid waste does not become deposited in the bottom of the tank, but it stirred up and removed by the pump.

The pump should be connected to a float switch interrupted located toward the bottom of the sump tank. This ensures that should the sump tank run low on water, the pump will not run dry or lose its prime.

The overflow pipe toward the front of the media bed should be cut down so that it rests approximately an inch above the level of the media. A pipe screen should be added to the overflow to ensure that no media or other debris falls into it.

Pump out accesses can be cut lower to the media for aesthetic purposes. Covers should be added to these accesses to ensure that neither debris nor animals do not fall into them.

When the plumbing is finished, fill the bed to the desired standing water level inside of the bed. In this embodiment, that water level is 2 inches below the media. As the bed fills, the vertical standpipe inside of the tank will fill as well. Once the bed is at the desired level, cut the stand pipe inside of the tank 2 inches below the water level inside of the pipe. Affix a rubber coupling (236) to the stand pipe with a hose clamp. The top of the rubber couple should sit 2 inches above the top of the stand pipe. This will return the static water level to this height when the beds are running. The rubber coupling allows the height of the water level in the bed to easily be adjusted to compensate for water flow once the bed is operational.

With the bed full, check the coupling connection between the drainage line from the bed and the sump tank to ensure the couple is not leaking. If the bulkhead and couplings appear dry, carefully backfill the trench with sand or clean fill.

Once the bed is finalized, the tank should be filled to a few inches below the vertical standpipe. The bed can be cycled using inoculant fluids from another system to rapidly increase the adaptation and proliferation of necessary biota. When the bed is cycling, the main valve connecting the pump to the waste inlet manifold should be adjusted so that water is entering the bed at the rate that it can efficiently flow through the bed. If the bed appears to be flooding, dial the pump back slightly until a stable flow is established.

Waste should be slowly introduced to the bed at a rate that maintains the water quality within the effective ranges of the biota. This will allow for a smooth system startup. If plants are to be utilized in the bed, they should be introduced once the water quality parameters have settled into a range safe for their introduction into the bed.

Example 3

Media Bed Set Up

Building the Media Bed Bioreactor
1. Assembly
2. Sequential Initiation of biological community Once the Media Bed has been assembled it should be filled with potable water and the aeration system activated. If chlorine is present (as in many municipal supplies) the water in the system should be circulated for 24 hours to allow outgas sing of the chlorine. After 24 hours (or immediately after filing if no chlorine is present) a microbial inoculant is added to the media bed bioreactor. This inoculant can be taken from the waste stream of a functioning system either in or directly after the media bed bioreactor. Alternatively the inoculant may be composed of selected microbes. Inoculation is followed with an amount of biological waste (e.g., derived from chicken, hog, or fish) or household liquid ammonia to raise ammonia levels to about 15 ppm. This will allow nitrifying microbes to increase in population and begin conversion of ammonia to nitrite. Ammonia levels will begin to drop as the microbes convert ammonia to nitrite. Nitrite levels will rise proportionately then microbes converting nitrite to nitrate will be activated and nitrate levels will begin to rise as ammonia and nitrite levels fall in one to seven days. Once ammonia levels drop to less than 1.0 ppm then earthworms (initial stocking rate of approximately 500 $m^3$) should be added directly to the media bed. Plants can also be added to the media bed bioreactor at this time as desired. Waste treatment can begin at this point.

Wastes will inherently vary in Biological Oxygen Demand (BOD) and Chemical Oxygen Demand (COD) as well as concentration and digestibility of bio-solids in the aqueous waste stream. The BOD, COD or combination thereof is often greater than about 3 ppm in waste (e.g., aqueous waste, oxidizable waste). Therefore loading rates should be determined empirically with each major variation in waste treated (e.g. switch from one lot of chicken waste to another, one fish species feeding rate to another, one fish species to another, etc.) in order that system critical values are maintained. In some embodiments, loading rates should maintain dissolved oxygen at ≥3.0 ppm in the media bed.

If the media bed bioreactor system is being used in an aquaculture treatment aquaponics system, fish or other cultured species can be introduced when initial unionized ammonia is consistently maintained at ≤0.05 ppm and dissolved oxygen in the aquaculture portion of the system is sufficient for the crop species deployed. Introducing fish earlier will kill them regardless of dissolved oxygen levels.

Nitrate is the least toxic form of nitrogen ions in the system. In general nitrate levels should be maintained below about 800 ppm for aquaculture systems employing a media bed. Loading rates for systems with ammonia present in the waste stream, or likely to form in the waste stream, should not exceed the biomass of the worms and DO should be maintained at greater than or equal to 3.0 ppm. If waste loading exceeds the biomass of the worms, the worm will not be able to keep up and heterotrophic microbes will quickly increase in population. Heterotrophic microbes can increase their population much more rapidly than nitrifying bacteria which will stop oxidation of ammonia to nitrite, allowing ammonia to build to toxic levels.

Additionally, this system makes no claims to reduce organic chemical pollution (e.g. antibiotics, pharmaceuticals) in the aqueous waste stream. Therefore a waste stream can be monitored for hazardous waste that may include high levels of metals or chemicals that might kill worms, microbes, fish, plants of a biomass. Non-limiting examples of hazardous waste include waste comprising cadmium (Cd) at levels greater than 1843 ppm, Arsenic (As) at levels greater than 100 ppm in 21 days, lead (Pb) at levels greater than 4480 ppm, copper (Cu) at levels greater than 643 ppm, zinc (Zn) at levels greater than 662 ppm, nickel (Ni) at levels greater than 757 ppm and chromium (Cr) at levels greater than 1800 ppm, which can be toxic to some earthworm species after a period of exposure of 14 days or more. These metals are not typically found at such high levels in aqueous waste streams, but may be present in some undiluted hazardous waste discharged from a factory or industrial manufacturing plant. Some hazardous waste comprises high levels of pesticides which vary substantially in their toxicity to worms, plants and microbes. Accordingly, in certain embodiments aqueous waste and/or oxidized waste is not hazardous waste. Some metal ions are necessary plant micronutrients (e.g. copper, boron, calcium) but may be toxic to plants at higher levels. Whereas other heavy metals that are not micronutrients for plants may also be incorporated into plant materials but can be treated separately in the removed plant materials.

3. Continued Operation

Waste streams are inherently variable in BOD, COD, particle size and chemical composition. Therefore the most critical monitoring of the system will need to capture this variability in the empirical functioning of the system. Additionally the rates of biochemical and chemical processes of this system are dependent on temperature and dissolved oxygen concentrations and the health of the organisms employed. Optimal temperature for growth of nitrifying bacteria is often 20-30° C. with a minimum of 4° C. and death occurring at 0° C. Earthworms have an optimal range of about 15-25° C. Therefore, in some embodiments, the temperature of a system is maintained at 20-25° C. to optimize both microbial activity and the activity of the annelid oligochaete worms. The lower limit of the system (4° C.) is often determined by the temperature minimum for microbes that convert nitrite to nitrate. If they are not operating, nitrates will not form, greatly slowing plant growth, and nitrites will accumulate. If fish are present—this accumulation of nitrite will poison them regardless of ammonia or dissolved oxygen levels.

In some embodiments, dissolved oxygen is maintained at ≥3.0 ppm. While earthworms and fish may tolerate lower dissolved oxygen rates, the common microbes responsible for oxidizing ammonia to nitrite will often cease to function below this level and ammonia will accumulate. Experience indicates proper DO levels are difficult to maintain with atmospheric aeration, especially at temperatures above 32° C. Accordingly, in some embodiments, a media bed comprises a forced aeration system using atmospheric air, or air supplemented with higher levels of oxygen.

In some embodiments, a media bed will operate normally within a pH range of 6.5 to 9.0, which is compatible for most freshwater organisms. However care must be taken to monitor ammonia levels. If pH falls below 6.5, the activity of microbes that convert ammonia to nitrite will slow, and ammonia can build rapidly. Adjusting pH upward can be accomplished with a number of common chemicals but care must be used to avoid those containing sodium (e.g. sodium bicarbonate or sodium hydroxide) as the sodium rapidly changes the salinity, alkalinity, and electrical conductivity of the water. This is also important for plant growth, if plants are fertilized with the effluent of a media bed, or used in the media bed directly. Maintaining alkalinity of 100-150 ppm $CaCO_3$ is also helpful to maintain the microbial nitrification processes.

In some embodiments, chelated iron is needed to be added to maintain iron levels in the effluent and/or media bed at levels sufficient for plant growth. Iron (Fe) has multiple valence states. The $Fe^{3+}$ form is the most common form of iron on earth but the $Fe^{2+}$ is much more useful by plants. Unfortunately the $Fe^{2+}$ readily converts to $Fe^{3+}$ and precipitates out of solution at the pH and DO levels utilized in a media bed. Iron chelates such as Fe-EDTA (stable to pH 6.0, and present to pH 9.0) is relatively cheap compared to Fe DPTA (stable to pH 7.0 and present to pH 10.0). Given that plant nutritional needs vary strongly by species it is best to empirically monitor plants for signs of Fe deficiency (interveinal chlorosis) and correct according. In general we have found 150 ml of powdered Fe DPTA/1800 L water/week is sufficient to prevent iron stress in plants grown in a media bed. Addition of potassium (K) may also be needed if plants with exceptionally high demands for K (e.g., bananas) are grown in the media bed.

Lastly, aqueous waste streams to be treated in a media bed should be monitored for the presence of toxic chemical pollutants (e.g., antibiotics, pharmaceuticals) and other chemical pollutants (e.g., heavy metals) in an aqueous waste stream. Such pollutants should be low enough so that they are not toxic to organisms in the system.

Example 4

Embodiments

A1. An apparatus comprising:
a media bed comprising a biomass, wherein (i) the biomass comprises water and worms, (ii) the worms are submerged in the water, and (iii) the water comprises an oxygen content of at least 3 ppm.

A2. The apparatus of embodiment A1, wherein the water further comprises un-ionized ammonia at an amount of 5 ppm or less.

A3. The apparatus of embodiment A1 or A2, wherein the biomass comprises oxidizable waste.

A3.1. The apparatus of any one of embodiments A1 or A3, wherein the water comprises oxidizable waste.

A4. The apparatus of any one of embodiments, A1 to A3.1, wherein the media bed further comprising media.

A5. The apparatus of embodiments A4, wherein the media comprises aggregates, fibers or particles.

A6. The apparatus of embodiment A4 or A5, wherein the media is selected from one or more of activated carbon, granular activated carbon (GAC), pelletized activated carbon, polymeric fibers, crushed stone, pumice, sand, plastic media, gravel, recycled glass, and expanded lightweight aggregate A7. The apparatus of any one of embodiments A5 to A6, wherein the aggregates, fibers or particles have an average diameter in a range of about 10 microns to about 5 cm.

A8. The apparatus of any one of embodiments A1 to A7, wherein the worms are earthworms.

A9. The apparatus of any one of embodiments A1 to A8, wherein the media bed comprises a minimum average, minimum mean or minimum absolute worm density of at least 100 worms/m$^3$, at least 500 worms/m$^3$, or at least 1000 worms/m$^3$, or at least 10,000 worms/m$^3$.

A10. The apparatus of any one of embodiments A1 to A8, wherein the media bed comprises an average, mean or absolute worm density of about 100 worms/m$^3$ to about 100,000 worms/m$^3$, about 1000 worms/m$^3$ to about 100,000 worms/m$^3$, about 100 worms/m$^3$ to about 10,000 worms/m$^3$, about 500 worms/m$^3$ to about 10,000 worms/m$^3$, or about 1000 worms/m$^3$ to about 10,000 worms/m$^3$.

A11. The apparatus of any one of embodiments A1 to A10, wherein the earthworms comprise an earthworm of a family selected from the list consisting of Acanthodrilidae, Ailoscolecidae, Almidae, Benhamiinae, Octochaetidae, Criodrilidae, Diplocardiinae, Acanthodrilidae, Enchytraeidae, Eudrilidae, Exxidae, Glossoscolecidae, Haplotaxidae, Hormogastridae, Kynotidae, Lumbricidae, Lutodrilidae, Megascolecidae, Microchaetidae, Moniligastridae, Ocnerodrilidae, Octochaetidae, Octochaetinae, Sparganophilidae, and Tumakidae.

A12. Please replace the paragraph A11 with the following The apparatus of any one of embodiments A1 to A11, wherein the earthworms comprise an earthworm of a species selected from the list consisting of *Alloborpha callignosa, Eisenia fetida, Eisenia andrei, Dendrodrilus rubidus, Dendrobaena hortensis, Dendrobaena veneta, Lumbricus rubellus, Lumbricus terrestris, Drawida nepalensis, Eudrilus eugeniae, Perionyx excavates, Polypheretima elongate*, and *Lampito maurittii*.

A13. The apparatus of any one of embodiments A1 to A12, wherein the earthworms comprise an earthworm of a species *Eisenia fetida, Eisenia andrei, Lumbricus rubellus*, or *Lumbricus terrestris*.

A14. The apparatus of any one of embodiments A1 to A13, wherein the water comprises an oxygen content of at least 4 ppm, at least 5 ppm, at least 6 ppm or at least 7 ppm.

A15. The apparatus of any one of embodiments A1 to A13, wherein the water comprises an oxygen content in a range of about 3 ppm to about 15 ppm, about 3 ppm to about 10 ppm, about 4 ppm to about 15 ppm, about 4 ppm to about 10 ppm, about 5 ppm to about 15 ppm, about 5 ppm to about 10 ppm, about 6 ppm to about 15 ppm, or about 6 ppm to about 10 ppm.

A16. The apparatus of any one of embodiments A1 to A15, wherein the media bed further comprising one or more plants.

A17. The apparatus of embodiment A16, wherein the plants are aquatic plants.

A17.1. The apparatus of embodiment A16, wherein the plants are terrestrial plants.

A18. The apparatus of embodiment A16 or A17.1, wherein the plants, or a portion thereof, are in physical contact with the water.

A19. The apparatus of any one of embodiments A1 to A18, wherein an amount of the water in the biomass is at least 30%, at least 50% or at least 70% of a volume of the biomass.

A20. The apparatus of any one of embodiments A1 to A19, wherein an amount of the water in the biomass is in a range of about 30% to about 80%, about 30% to about 70%, about 40% to about 80% or about 40% to about 70% of a volume of the biomass.

A21. The apparatus of any one of embodiments A1 to A20, wherein the biomass further comprising microbes.

A22. The apparatus of embodiment 21, wherein the microbes are bacteria or archaea selected from the group consisting of *Nitrosomonas, Nitrosospira, Nitrosococcus, Nitrosolobus. Nitrosopumilus, Nitrososphaera, Nitrobacter, Nitrospina, Nitrococcus*, and combinations thereof.

A22.1. The apparatus of any one of embodiments A1 to A22, wherein the microbes comprise a bacteria of the species *Nitrosomonas europaea* (ATCC 25978) and/or a bacteria of the species *Nitrobacter winogradskyi*.

A23. The apparatus of any one of embodiments A1 to A22, wherein the water is freshwater comprising a salinity of less than about 7 parts per thousand (ppt), less than about 6 ppt, or less than about 5 ppt.

A24. The apparatus of any one of embodiments A1 to A22, wherein the water is salt water comprising a salinity of at least 7 ppt, at least 10 ppt or at least 30 ppt.

A25. The apparatus of embodiment A24, wherein the worms are mud worms, clam worms, or a combination thereof.

A26. The apparatus of any one of embodiments A1 to A25, wherein the media bed further comprises a container, a waste inlet, and a treated waste outlet.

A27. The apparatus of embodiment A26, wherein the container comprises the biomass.

A28. The apparatus of embodiment A26 or A27, wherein the container comprises the media.

A29. The apparatus of any one of embodiments A26 to A28, wherein the container comprises a bottom and one or more sidewalls.

A29.1. The apparatus of any one of embodiments A26 to A29, wherein the container comprises a sealed top.

A30. The apparatus of any one of embodiments A26 to A29.1, wherein the container comprises four side walls arranged in a substantially rectangular shape and a bottom substantially coextensive with the sidewalls.

A31. The apparatus of any one of embodiments A26 to A30, wherein the container is substantially water tight.

A32. The apparatus of any one of embodiments A26 to A31, wherein the container comprises an interior having a volume capacity of 5 liters to 100,000 liters.

A33. The apparatus of any one of embodiments A26 to A32, wherein the container comprises an aeration means configured to introduce air or oxygen into contents of the container.

A34. The apparatus of embodiment A33, wherein the aeration means is configured to introduce air or oxygen into the biomass or the water.

A35. The apparatus of embodiment A33 or A34, wherein the aeration means comprises a perforated conduit.

A36. The apparatus of any one of embodiments A33 to A35, wherein the aeration means comprises a plurality of air inlets located in the one or more sidewalls or bottom of the container.

A37. The apparatus of any one of embodiments A33 to A34, wherein the aeration means comprises a pump operably coupled to the conduit or the plurality of air inlets.

A38. The apparatus of any one of embodiments A33 to A37, wherein the container comprises the waste inlet.

A39. The apparatus of any one of embodiments A33 to A38, wherein the waste inlet is operably coupled to one or more waste conduits located in the interior of the container.

A40. The apparatus of any one of embodiments A33 to A39, wherein the one or more waste conduits comprise pipes or tubes.

A41. The apparatus of any one of embodiments A33 to A40, wherein the one or more waste conduits have an inside diameter of at least 1 cm, or in a range of 1 cm to about 1 meter.

A42. The apparatus of any one of embodiments A33 to A41, wherein the one or more waste conduits comprise one or more valves.

A43. The apparatus of any one of embodiments A33 to A42, wherein the one or more waste conduits comprise a manifold comprising a plurality of perforations or holes configured to introduce oxidizable waste into the container.

A44. The apparatus of any one of embodiments A33 to A43, wherein the one or more waste conduits comprise a first end comprising an opening, optionally coupled to a valve, wherein the opening has an inside diameter of at least 1 cm, or in a range of 1 cm to about 1 meter.

A45. The apparatus of any one of embodiments A33 to A44, wherein the one or more waste conduits comprise one or more fittings selected from T-fittings, elbows, adapters, and clamps.

A46. The apparatus of any one of embodiments A33 to A45, wherein the one or more waste conduits comprise one or more regulators or gauges.

A46.1. The apparatus of any one of embodiments A26 to A46, wherein the waste inlet is operably coupled to a waste intake system located exterior to the media bed or container.

A47. The apparatus of any one of embodiments A33 to A46.1, wherein the waste inlet is operably coupled to a waste pump configured to introduce waste into the container through the one or more waste conduits.

A47.1. The apparatus of embodiment A47, wherein a waste intake system comprises the waste pump.

A48. The apparatus of embodiment A47 or A47.1, wherein the waste pump comprises an input port and an output port.

A49. The apparatus of embodiment A48, wherein the waste inlet is operably coupled to the output port of the waste pump.

A50. The apparatus of any one of embodiments A48 to A49, wherein the input port of the waste pump is operably coupled to a waste intake conduit located exterior to the container.

A51. The apparatus of any one of embodiments A48 to A50, wherein the waste intake conduit comprises a first end located at a waste source and a second end operably coupled to the input port of the waste pump.

A52. The apparatus of any one of embodiments A48 to A51, wherein the waste pump or the waste intake system is configured to transport waste from a waste source to the media bed, or from the waste source to the interior of the container.

A53. The apparatus of any one of embodiments A48 to A49, wherein the pump is operably coupled to a return conduit having a first end operably coupled to the output port of the waste pump and a second end located at a waste source.

A54. The apparatus of any one of embodiments A48 to A53, wherein the second end of the return conduit comprises an opening.

A55. The apparatus of any one of embodiments A48 to A53, wherein the return conduit comprises one or more fittings, valves, regulators, or gauges.

A56. The apparatus of any one of embodiments A48 to A55, wherein the waste intake system comprises the intake conduit, the return conduit and optionally, one or more fittings, adaptors, valves, regulators or gauges.

A57. The apparatus of any one of embodiments A26 to A37, wherein the container comprises the treated waste outlet.

A58. The apparatus of embodiment A57, wherein the treated waste outlet comprises a bulkhead operably integrated into a sidewall of the container.

A59. The apparatus of any one of embodiments A26 to A58, wherein the treated waste outlet is operably coupled to one or more treated waste outlet conduits located in the interior of the container.

A59.1. The apparatus of embodiment A58 or A59, wherein the bulkhead comprises an interior side located inside the container, and an exterior side located outside the container, and the interior side of the bulkhead is operably coupled to the one or more treated waste outlet conduits.

A60. The apparatus of embodiment A59, wherein the one or more treated waste outlet conduits comprise pipes or tubes.

A61. The apparatus of any one of embodiments A26 to A60, wherein the one or more treated waste outlet conduits have an inside diameter of at least 1 cm, or in a range of 1 cm to about 1 meter.

A62. The apparatus of any one of embodiments A33 to A61, wherein the one or more treated waste outlet conduits comprise one or more valves.

A63. The apparatus of any one of embodiments A33 to A62, wherein the one or more waste outlet conduits comprise a manifold comprising a plurality of perforations or holes.

A64. The apparatus of any one of embodiments A33 to A63, wherein at least one of the one or more treated waste outlet conduits is an overflow drain comprising a first end comprising an opening, wherein the opening has an inside diameter of at least 1 cm, or in a range of 1 cm to about 1 meter.

A65. The apparatus of any one of embodiments A33 to A64, wherein the one or more treated waste outlet conduits comprise one or more fittings selected from T-fittings, elbows, adapters, and clamps.

A66. The apparatus of any one of embodiments A33 to A65, wherein the one or more treated waste outlet conduits comprise one or more regulators or gauges.

A67. The apparatus of any one of embodiments A1 to A66, wherein the media bed comprises a water inlet configured for introducing water into the container.

A68. The apparatus of any one of embodiments A1 to A67, wherein the treated waste outlet is operably coupled to a treated waste return conduit.

A69. The apparatus of any one of embodiments A1 to A68, wherein the treated waste return conduit comprises a waste return pump.

A70. The apparatus of any one of embodiments A1 to A69, wherein the treated waste return conduit comprises one or more fittings, adaptors, valves, regulators or gauges.

A71. The apparatus of any one of embodiments A1 to A70, wherein the treated waste return comprises an open end operably coupled to a waste source.

A71.1. The apparatus of any one of embodiments A1 to A71, further comprising a homogenizer, blender, grinder or blender pump.

A71.2. The apparatus of any one of embodiments A1 to A71.1, wherein the treated waste return is operably coupled to a discharge conduit terminating with an open end, optionally coupled to a valve configured for discharge of treated waste into an external environment.

A71.3. The apparatus of any one of embodiments A1 to A71, wherein the treated waste return comprises a stand pipe operably coupled to, or terminating in a waste source.

A72. The apparatus of any one of embodiments A1 to A72, wherein the waste source comprises a fish tank, a separating tank, a mixing tank, a holding tank, a bioreactor or a sump tank.

A73. The apparatus of any one of embodiments A1 to A72, wherein the media bed or the container has a depth of about 6 inches to about 10 feet.

A74. The apparatus of any one of embodiments A1 to A73, wherein the media bed or the container has a depth of about one foot to about four feet.

A75. The apparatus of any one of embodiments A1 to A74, wherein the biomass, or a combination of the biomass and the media, has a depth of about 6 inches to about 10 feet.

A76. The apparatus of any one of embodiments A1 to A75, wherein the biomass, or a combination of the biomass and the media, has a depth of about one foot to about four feet.

B1. A media bed comprising:
a biomass, wherein (i) the biomass comprises water and worms, (ii) the worms are submerged in the water, and (iii) the water comprises an oxygen content of at least 3 ppm.

B2. The media bed of embodiment B1, wherein the water further comprises un-ionized ammonia at an amount of 5 ppm or less.

B3. The media bed of embodiment B1 or B2, wherein the biomass comprises oxidizable waste.

B3.1. The media bed of any one of embodiments B1 or B3, wherein the water comprises oxidizable waste.

B4. The media bed of any one of embodiments, B1 to B3.1, wherein the media bed further comprising media.

B5. The media bed of embodiments B4, wherein the media comprises aggregates, fibers or particles.

B6. The media bed of embodiment B4 or B5, wherein the media is selected from one or more of activated carbon, granular activated carbon (GBC), pelletized activated carbon, polymeric fibers, crushed stone, pumice, sand, plastic media, gravel, recycled glass, and expanded lightweight aggregate B7. The media bed of any one of embodiments B5 to B6, wherein the aggregates, fibers or particles have an average diameter in a range of about 10 microns to about 5 cm.

B8. The media bed of any one of embodiments B1 to B7, wherein the worms are earthworms.

B9. The media bed of any one of embodiments B1 to B8, wherein the media bed comprises a minimum average, minimum mean or minimum absolute worm density of at least 100 worms/m$^3$, at least 500 worms/m$^3$, or at least 1000 worms/m$^3$, or at least 10,000 worms/m$^3$.

B10. The media bed of any one of embodiments B1 to B8, wherein the media bed comprises an average, mean or absolute worm density of about 100 worms/m$^3$ to about 100,000 worms/m$^3$, about 1000 worms/m$^3$ to about 100,000 worms/m$^3$, about 100 worms/m$^3$ to about 10,000 worms/m$^3$, about 500 worms/m$^3$ to about 10,000 worms/m$^3$, or about 1000 worms/m$^3$ to about 10,000 worms/m$^3$.

B11. The media bed of any one of embodiments B1 to B10, wherein the earthworms comprise an earthworm of a family selected from the list consisting of Bcanthodrilidae, Biloscolecidae, Blmidae, Benhamiinae, Octochaetidae, Criodrilidae, Diplocardiinae, Bcanthodrilidae, Enchytraeidae, Eudrilidae, Exxidae, Glossoscolecidae, Haplotaxidae, Hormogastridae, Kynotidae, Lumbricidae, Lutodrilidae, Megascolecidae, Microchaetidae, Moniligastridae, Ocnerodrilidae, Octochaetidae, Octochaetinae, Sparganophilidae, and Tumakidae.

B12. The media bed of any one of embodiments B1 to B11, wherein the earthworms comprise an earthworm of a species selected from the list consisting of *Blloborpha callignosa, Eisenia fetida, Eisenia andrei, Dendrodrilus rubidus, Dendrobaena hortensis, Dendrobaena veneta, Lumbricus rubellus, Lumbricus terrestris, Drawida nepalensis, Eudrilus eugeniae, Perionyx excavates, Polypheretima elongate,* and *Lampito maurittii*

B13. The media bed of any one of embodiments B1 to B12, wherein the earthworms comprise an earthworm of a species *Eisenia fetida, Eisenia andrei, Lumbricus rubellus,* or *Lumbricus terrestris.*

B14. The media bed of any one of embodiments B1 to B13, wherein the water comprises an oxygen content of at least 4 ppm, at least 5 ppm, at least 6 ppm or at least 7 ppm.

B15. The media bed of any one of embodiments B1 to B13, wherein the water comprises an oxygen content in a range of about 3 ppm to about 15 ppm, about 3 ppm to about 10 ppm, about 4 ppm to about 15 ppm, about 4 ppm to about 10 ppm, about 5 ppm to about 15 ppm, about 5 ppm to about 10 ppm, about 6 ppm to about 15 ppm, or about 6 ppm to about 10 ppm.

B16. The media bed of any one of embodiments B1 to B15, wherein the media bed further comprising one or more plants.

B17. The media bed of embodiment B16, wherein the plants are aquatic plants.

B17.1. The media bed of embodiment B16, wherein the plants are terrestrial plants.

B18. The media bed of embodiment B16 or B17.1, wherein the plants, or a portion thereof, are in physical contact with the water.

B19. The media bed of any one of embodiments B1 to B18, wherein an amount of the water in the biomass is at least 30%, at least 50% or at least 70% of a volume of the biomass.

B20. The media bed of any one of embodiments B1 to B19, wherein an amount of the water in the biomass is in a range of about 30% to about 80%, about 30% to about 70%, about 40% to about 80% or about 40% to about 70% of a volume of the biomass.

B21. The media bed of any one of embodiments B1 to B20, wherein the biomass further comprising microbes.

B22. The media bed of embodiment 21, wherein the microbes are bacteria or archaea selected from the group consisting of *Nitrosomonas, Nitrosospira, Nitrosococcus, Nitrosolobus. Nitrosopumilus, Nitrososphaera, Nitrobacter, Nitrospina, Nitrococcus,* and combinations thereof.

B22.1. The media bed of any one of embodiments B1 to B22, wherein the microbes comprise a bacteria of the species *Nitrosomonas europaea* (BTCC 25978) and/or a bacteria of the species *Nitrobacter winogradskyi.*

B23. The media bed of any one of embodiments B1 to B22, wherein the water is freshwater comprising a salinity of less than about 7 parts per thousand (ppt), less than about 6 ppt, or less than about 5 ppt.

B24. The media bed of any one of embodiments B1 to B22, wherein the water is salt water comprising a salinity of at least 7 ppt, at least 10 ppt or at least 30 ppt.

B25. The media bed of embodiment B24, wherein the worms are mud worms, clam worms, or a combination thereof.

B26. The media bed of any one of embodiments B1 to B25, wherein the media bed further comprises a container, a waste inlet, and a treated waste outlet.

B27. The media bed of embodiment B26, wherein the container comprises the biomass.

B28. The media bed of embodiment B26 or B27, wherein the container comprises the media.

B29. The media bed of any one of embodiments B26 to B28, wherein the container comprises a bottom and one or more sidewalls.

B29.1. The media bed of any one of embodiments B26 to B29, wherein the container comprises a sealed top.

B30. The media bed of any one of embodiments B26 to B29.1, wherein the container comprises four side walls arranged in a substantially rectangular shape and a bottom substantially coextensive with the sidewalls.

B31. The media bed of any one of embodiments B26 to B30, wherein the container is substantially water tight.

B32. The media bed of any one of embodiments B26 to B31, wherein the container comprises an interior having a volume capacity of 5 liters to 100,000 liters.

B33. The media bed of any one of embodiments B26 to B32, wherein the container comprises an aeration means configured to introduce air or oxygen into contents of the container.

B34. The media bed of embodiment B33, wherein the aeration means is configured to introduce air or oxygen into the biomass or the water.

B35. The media bed of embodiment B33 or B34, wherein the aeration means comprises a perforated conduit.

B36. The media bed of any one of embodiments B33 to B35, wherein the aeration means comprises a plurality of air inlets located in the one or more sidewalls or bottom of the container.

B37. The media bed of any one of embodiments B33 to B34, wherein the aeration means comprises a pump operably coupled to the conduit or the plurality of air inlets.

B38. The media bed of any one of embodiments B33 to B37, wherein the container comprises the waste inlet.

B39. The media bed of any one of embodiments B33 to B38, wherein the waste inlet is operably coupled to one or more waste conduits located in the interior of the container.

B40. The media bed of any one of embodiments B33 to B39, wherein the one or more waste conduits comprise pipes or tubes.

B41. The media bed of any one of embodiments B33 to B40, wherein the one or more waste conduits have an inside diameter of at least 1 cm, or in a range of 1 cm to about 1 meter.

B42. The media bed of any one of embodiments B33 to B41, wherein the one or more waste conduits comprise one or more valves.

B43. The media bed of any one of embodiments B33 to B42, wherein the one or more waste conduits comprise a manifold comprising a plurality of perforations or holes configured to introduce oxidizable waste into the container.

B44. The media bed of any one of embodiments B33 to B43, wherein the one or more waste conduits comprise a first end comprising an opening, optionally coupled to a valve, wherein the opening has an inside diameter of at least 1 cm, or in a range of 1 cm to about 1 meter.

B45. The media bed of any one of embodiments B33 to B44, wherein the one or more waste conduits comprise one or more fittings selected from T-fittings, elbows, adapters, and clamps.

B46. The media bed of any one of embodiments B33 to B45, wherein the one or more waste conduits comprise one or more regulators or gauges.

B46.1. The media bed of any one of embodiments B26 to B46, wherein the waste inlet is operably coupled to a waste intake system located exterior to the media bed or container.

B47. The media bed of any one of embodiments B33 to B46.1, wherein the waste inlet is operably coupled to a waste pump configured to introduce waste into the container through the one or more waste conduits.

B47.1. The media bed of embodiment B47, wherein a waste intake system comprises the waste pump.

B48. The media bed of embodiment B47 or B47.1, wherein the waste pump comprises an input port and an output port.

B49. The media bed of embodiment B48, wherein the waste inlet is operably coupled to the output port of the waste pump.

B50. The media bed of any one of embodiments B48 to B49, wherein the input port of the waste pump is operably coupled to a waste intake conduit located exterior to the container.

B51. The media bed of any one of embodiments B48 to B50, wherein the waste intake conduit comprises a first end located at a waste source and a second end operably coupled to the input port of the waste pump.

B52. The media bed of any one of embodiments B48 to B51, wherein the waste pump or the waste intake system is configured to transport waste from a waste source to the media bed, or from the waste source to the interior of the container.

B53. The media bed of any one of embodiments B48 to B49, wherein the pump is operably coupled to a return conduit having a first end operably coupled to the output port of the waste pump and a second end located at a waste source.

B54. The media bed of any one of embodiments B48 to B53, wherein the second end of the return conduit comprises an opening.

B55. The media bed of any one of embodiments B48 to B53, wherein the return conduit comprises one or more fittings, valves, regulators, or gauges.

B56. The media bed of any one of embodiments B48 to B55, wherein the waste intake system comprises the intake conduit, the return conduit and optionally, one or more fittings, adaptors, valves, regulators or gauges.

B57. The media bed of any one of embodiments B26 to B37, wherein the container comprises the treated waste outlet.

B58. The media bed of embodiment B57, wherein the treated waste outlet comprises a bulkhead operably integrated into a sidewall of the container.

B59. The media bed of any one of embodiments B26 to B58, wherein the treated waste outlet is operably coupled to one or more treated waste outlet conduits located in the interior of the container.

B59.1. The media bed of embodiment B58 or B59, wherein the bulkhead comprises an interior side located inside the container, and an exterior side located outside the container, and the interior side of the bulkhead is operably coupled to the one or more treated waste outlet conduits.

B60. The media bed of embodiment B59, wherein the one or more treated waste outlet conduits comprise pipes or tubes.

B61. The media bed of any one of embodiments B26 to B60, wherein the one or more treated waste outlet conduits have an inside diameter of at least 1 cm, or in a range of 1 cm to about 1 meter.

B62. The media bed of any one of embodiments B33 to B61, wherein the one or more treated waste outlet conduits comprise one or more valves.

B63. The media bed of any one of embodiments B33 to B62, wherein the one or more waste outlet conduits comprise a manifold comprising a plurality of perforations or holes.

B64. The media bed of any one of embodiments B33 to B63, wherein at least one of the one or more treated waste outlet conduits is an overflow drain comprising a first end comprising an opening, wherein the opening has an inside diameter of at least 1 cm, or in a range of 1 cm to about 1 meter.

B65. The media bed of any one of embodiments B33 to B64, wherein the one or more treated waste outlet conduits comprise one or more fittings selected from T-fittings, elbows, adapters, and clamps.

B66. The media bed of any one of embodiments B33 to B65, wherein the one or more treated waste outlet conduits comprise one or more regulators or gauges.

B67. The media bed of any one of embodiments B1 to B66, wherein the media bed comprises a water inlet configured for introducing water into the container.

B68. The media bed of any one of embodiments B1 to B67, wherein the treated waste outlet is operably coupled to a treated waste return conduit.

B69. The media bed of any one of embodiments B1 to B68, wherein the treated waste return conduit comprises a waste return pump.

B70. The media bed of any one of embodiments B1 to B69, wherein the treated waste return conduit comprises one or more fittings, adaptors, valves, regulators or gauges.

B71. The media bed of any one of embodiments B1 to B70, wherein the treated waste return comprises an open end operably coupled to a waste source.

B71.1. The media bed of any one of embodiments B1 to B71, further comprising a homogenizer, blender, grinder or blender pump.

B71.2. The media bed of any one of embodiments B1 to B71.1, wherein the treated waste return is operably coupled to a discharge conduit terminating with an open end, optionally coupled to a valve configured for discharge of treated waste into an external environment.

B71.3. The media bed of any one of embodiments B1 to B71, wherein the treated waste return comprises a stand pipe operably coupled to, or terminating in a waste source.

B72. The media bed of any one of embodiments B1 to B72, wherein the waste source comprises a fish tank, a separating tank, a mixing tank, a holding tank, a bioreactor or a sump tank.

B73. The media bed of any one of embodiments B1 to B72, wherein the media bed or the container has a depth of about 6 inches to about 10 feet.

B74. The media bed of any one of embodiments B1 to B73, wherein the media bed or the container has a depth of about one foot to about four feet.

B75. The media bed of any one of embodiments B1 to B74, wherein the biomass, or a combination of the biomass and the media, has a depth of about 6 inches to about 10 feet.

B76. The media bed of any one of embodiments B1 to B75, wherein the biomass, or a combination of the biomass and the media, has a depth of about one foot to about four feet.

C1. A waste treatment system comprising the apparatus or media bed of any one of embodiments A1 to A76 or B1 to B76, wherein the waste treatment system further comprises one or more of a fish tank, a separating tank, a mixing tank, a sump tank, a holding tank, and a bioreactor.

C2. The waste treatment system of embodiments C1, wherein the fish tank is operably coupled to the media bed.

C3. The waste treatment system of embodiment C1 or C2, wherein the fish tank is operably coupled to the separating tank, which is operably coupled to the media bed, and the media bed is operably coupled to the fish tank, thereby providing a recycling system wherein waste is transported from the fish tank to the separating tank, from the separating tank to the media bed, and from the media bed back to the fish tank.

C4. The waste treatment system of embodiment C3, further comprising one or more bioreactors operably coupled to the separating tank and operable coupled to the media bed, wherein waste from the separating tank is transported from the separating tank to the one or more bioreactors, and from the one or more bioreactors to the media bed.

C5. The waste treatment system of any one of embodiments C1 to C4, comprising two or more media beds operably coupled in parallel or in series.

C6. The waste treatment system of any one of embodiments C1 to C5, wherein an inlet of the fish tank, the media bed or the separating tank is operably coupled to a primary waste source.

C7. The waste treatment system of embodiment C6, wherein the waste source is from an aquaculture system.

C8. The waste treatment system of embodiment C6, wherein the waste source comprises raw manure derived from a terrestrial agriculture system or farm.

C9. The waste treatment system of any one of embodiments C1 to C8, further comprising a homogenized, blender, grinder or blender pump.

C10. The waste treatment system of any one of embodiments C1 to C9, wherein the system is a closed system.

D1. An apparatus comprising:
a media bed having an inlet and an outlet, wherein the media bed comprises media and a biomass, the biomass comprising oxidizable waste, water and earthworms, wherein
  (i) the worms are submerged in the water,
  (ii) the water comprises oxygen at greater than 3 ppm and un-ionized ammonia at less than 1 ppm;
  (iii) the media is selected from the group consisting of activated carbon, granular activated carbon (GAC), pelletized activated carbon, polymeric fibers, crushed stone, pumice, sand, plastic media, gravel, recycled glass, expanded lightweight aggregate, and combinations thereof;
  (iv) the media comprises an average particle diameter ranging from about 10 microns to about 5 cm;
  (v) the media bed has a depth of about one foot to about four feet; and
  (vi) the water is about 30% to about 70% by volume of the media bed.

E1. An aquaponics system, comprising:
a fish tank containing a fluid;
a separating tank, the separating tank being fluidly connected to the fish tank;
a media bed, the media bed being fluidly connected to the separating tank and the fish tank;
wherein the system is configured to oxidize waste to nitrate and for the subsequent uptake of nitrates to plant life,
wherein the media bed comprises worms, an active aeration system, and continuous flow beds, and
wherein the aquaponics system is a closed system.

E2. The method of embodiment E1, wherein the media bed is a media bed of any one of embodiments B1 to B76.

F1. A method of treating a solid and liquid waste in an aquaponics system, comprising:
providing a fish tank containing a fluid;
providing a separating tank, the separating tank being fluidly connected to the fish tank;
providing a media bed, the media bed being fluidly connected to the separating tank and the fish tank;
delivering the fluid to the separating tank;
separating the fluid into solids and liquids in the separating tank;
converting ammonia in the liquids to nitrite, and nitrite into nitrate;

filtering the solids and liquids through the media bed;
removing nitrates from the liquids; and
delivering filtered liquids having a reduced nitrate content back to the fish tank; wherein the media bed comprises worms, an active aeration system, and continuous flow beds.

F2. The method of embodiment F1, wherein the media bed is a media bed of any one of embodiments B1 to B76.

G1. A method of treating waste comprising:
(a) providing a media bed comprising a biomass, wherein (i) the biomass comprises water and worms, (ii) the worms are submerged in the water, and (iii) the water comprises an oxygen content of at least 3 ppm; and
(b) contacting the biomass with aqueous waste or oxidizable waste, thereby forming a mixture.

G1.1. The method of embodiment G1, further comprising oxygenating the biomass or the water by an aeration means.

G1.2. The method of embodiment G1.1, wherein the aeration means comprises introducing air or oxygen into the biomass, thereby providing a biomass comprising a dissolved oxygen content of at least 3 ppm.

G1.3. The method of embodiment G1.1, wherein the aeration means comprises introducing air or oxygen into the water thereby, providing water comprising a dissolved oxygen content of at least 3 ppm.

G1.4. The method of any one of embodiments G1.1 to G1.3, wherein the air or oxygen is introduced through a perforated conduit.

G1.5. The method of embodiment G1 or G1.4, further comprising removing a portion of the mixture, wherein the portion of the mixture comprises treated waste.

G1.2. The method of embodiment G1.1, further comprising contacting the treated waste with the biomass, and removing a portion of the treated waste.

G2. The method of any one of embodiments G1 to G1.2, wherein the water further comprises un-ionized ammonia at an amount of 5 ppm or less.

G3. The method of any one of embodiments G1 to G2, wherein the biomass comprises oxidizable waste.

G3.1. The method of any one of embodiments G1 or G3, wherein the water comprises oxidizable waste.

G4. The method of any one of embodiments G1 to G3.1, wherein the media bed further comprising media.

G5. The method of embodiments G4, wherein the media comprises aggregates, fibers or particles.

G6. The method of embodiment G4 or G5, wherein the media is selected from one or more of activated carbon, granular activated carbon (GGC), pelletized activated carbon, polymeric fibers, crushed stone, pumice, sand, plastic media, gravel, recycled glass, and expanded lightweight aggregate G7. The method of any one of embodiments G5 to G6, wherein the aggregates, fibers or particles have an average diameter in a range of about 10 microns to about 5 cm.

G8. The method of any one of embodiments G1 to G7, wherein the worms are earthworms.

G9. The method of any one of embodiments G1 to G8, wherein the media bed comprises a minimum average, minimum mean or minimum absolute worm density of at least 100 worms/m$^3$, at least 500 worms/m$^3$, or at least 1000 worms/m$^3$, or at least 10,000 worms/m$^3$.

G10. The method of any one of embodiments G1 to G8, wherein the media bed comprises an average, mean or absolute worm density of about 100 worms/m$^3$ to about 100,000 worms/m$^3$, about 1000 worms/m$^3$ to about 100,000 worms/m$^3$, about 100 worms/m$^3$ to about 10,000 worms/m$^3$, about 500 worms/m$^3$ to about 10,000 worms/m$^3$, or about 1000 worms/m$^3$ to about 10,000 worms/m$^3$.

G11. The method of any one of embodiments G1 to G10, wherein the earthworms comprise an earthworm of a family selected from the list consisting of Gcanthodrilidae, Giloscolecidae, Glmidae, Genhamiinae, Octochaetidae, Criodrilidae, Diplocardiinae, Gcanthodrilidae, Gnchytraeidae, Gudrilidae, Gxxidae, Glossoscolecidae, Haplotaxidae, Hormogastridae, Kynotidae, Lumbricidae, Lutodrilidae, Megascolecidae, Microchaetidae, Moniligastridae, Ocnerodrilidae, Octochaetidae, Octochaetinae, Sparganophilidae, and Tumakidae.

G12. The method of any one of embodiments G1 to G11, wherein the earthworms comprise an earthworm of a species selected from the list consisting of *Glloborpha callignosa, Gisenia fetida, Gisenia andrei, Dendrodrilus rubidus, Dendrobaena hortensis, Dendrobaena veneta, Lumbricus rubellus, Lumbricus terrestris, Drawida nepalensis, Gudrilus eugeniae, Perionyx excavates, Polypheretima elongate*, and *Lampito maurittii*.

G13. The method of any one of embodiments G1 to G12, wherein the earthworms comprise an earthworm of a species *Gisenia fetida, Gisenia andrei, Lumbricus rubellus*, or *Lumbricus terrestris*.

G14. The method of any one of embodiments G1 to G13, wherein the water comprises an oxygen content of at least 4 ppm, at least 5 ppm, at least 6 ppm or at least 7 ppm.

G15. The method of any one of embodiments G1 to G13, wherein the water comprises an oxygen content in a range of about 3 ppm to about 15 ppm, about 3 ppm to about 10 ppm, about 4 ppm to about 15 ppm, about 4 ppm to about 10 ppm, about 5 ppm to about 15 ppm, about 5 ppm to about 10 ppm, about 6 ppm to about 15 ppm, or about 6 ppm to about 10 ppm.

G16. The method of any one of embodiments G1 to G15, wherein the media bed further comprising one or more plants.

G17. The method of embodiment G16, wherein the plants are aquatic plants.

G17.1. The method of embodiment G16, wherein the plants are terrestrial plants.

G18. The method of embodiment G16 or G17, wherein the plants, or a portion thereof, are in physical contact with the water.

G19. The method of any one of embodiments G1 to G18, wherein an amount of the water in the biomass is at least 30%, at least 50% or at least 70% of a volume of the biomass.

G20. The method of any one of embodiments G1 to G19, wherein an amount of the water in the biomass is in a range of about 30% to about 80%, about 30% to about 70%, about 40% to about 80% or about 40% to about 70% of a volume of the biomass.

G21. The method of any one of embodiments G1 to G20, wherein the biomass further comprising microbes.

G22. The method of embodiment 21, wherein the microbes are bacteria or archaea selected from the group consisting of *Nitrosomonas, Nitrosospira, Nitrosococcus, Nitrosolobus. Nitrosopumilus, Nitrososphaera, Nitrobacter, Nitrospina, Nitrococcus*, and combinations thereof.

G23. The method of any one of embodiments G1 to G22, wherein the water is freshwater comprising a salinity of less than about 35 parts per thousand (ppt), less than about 5 ppt, less than about 1 ppt. or less than about 0.5 ppt.

G24. The method of any one of embodiments G1 to G22, wherein the water is salt water comprising a salinity of at least 20 ppt, at least 30 ppt or at least 35 ppt.

G25. The method of embodiment G24, wherein the worms are mud worms, clam worms, or a combination thereof.

G26. The method of any one of embodiments G1 to G1.2, wherein the media bed further comprises a container, a waste inlet, and a treated waste outlet.

G27. The method of embodiment G26, wherein the container comprises the biomass.

G28. The method of embodiment G26 or G27, wherein the container comprises the media.

G29. The method of any one of embodiments G26 to G28, wherein the container comprises a bottom and one or more sidewalls.

G29.1. The method of any one of embodiments G26 to G29, wherein the container comprises a sealed top.

G30. The method of any one of embodiments G26 to G29.1, wherein the container comprises four side walls arranged in a substantially rectangular shape and a bottom substantially coextensive with the sidewalls.

G31. The method of any one of embodiments G26 to G30, wherein the container is substantially water tight.

G32. The method of any one of embodiments G26 to G31, wherein the container comprises an interior having a volume capacity of 5 liters to 100,000 liters.

G33. The method of any one of embodiments G26 to G32, wherein the container comprises an aeration means configured to introduce air or oxygen into contents of the container.

G34. The method of embodiment G33, wherein the aeration means is configured to introduce air or oxygen into the biomass or the water.

G35. The method of embodiment G33 or G34, wherein the aeration means comprises a perforated conduit.

G36. The method of any one of embodiments G33 to G35, wherein the aeration means comprises a plurality of air inlets located in the one or more sidewalls or bottom of the container.

G37. The method of any one of embodiments G33 to G34, wherein the aeration means comprises a pump operably coupled to the conduit or the plurality of air inlets.

G38. The method of any one of embodiments G33 to G37, wherein the container comprises the waste inlet.

G39. The method of any one of embodiments G33 to G38, wherein the waste inlet is operably coupled to one or more waste conduits located in the interior of the container.

G40. The method of any one of embodiments G33 to G39, wherein the one or more waste conduits comprise pipes or tubes.

G41. The method of any one of embodiments G33 to G40, wherein the one or more waste conduits have an inside diameter of at least 1 cm, or in a range of 1 cm to about 1 meter.

G42. The method of any one of embodiments G33 to G41, wherein the one or more waste conduits comprise one or more valves.

G43. The method of any one of embodiments G33 to G42, wherein the one or more waste conduits comprise a manifold comprising a plurality of perforations or holes configured to introduce oxidizable waste into the container.

G44. The method of any one of embodiments G33 to G43, wherein the one or more waste conduits comprise a first end comprising an opening, optionally coupled to a valve, wherein the opening has an inside diameter of at least 1 cm, or in a range of 1 cm to about 1 meter.

G45. The method of any one of embodiments G33 to G44, wherein the one or more waste conduits comprise one or more fittings selected from T-fittings, elbows, adapters, and clamps.

G46. The method of any one of embodiments G33 to G45, wherein the one or more waste conduits comprise one or more regulators or gauges.

G46.1. The method of any one of embodiments G26 to G46, wherein the waste inlet is operably coupled to a waste intake system located exterior to the media bed or container.

G47. The method of any one of embodiments G33 to G46.1, wherein the waste inlet is operably coupled to a waste pump configured to introduce waste into the container through the one or more waste conduits.

G47.1. The method of embodiment G47, wherein a waste intake system comprises the waste pump.

G48. The method of embodiment G47 or G47.1, wherein the waste pump comprises an input port and an output port.

G49. The method of embodiment G48, wherein the waste inlet is operably coupled to the output port of the waste pump.

G50. The method of any one of embodiments G48 to G49, wherein the input port of the waste pump is operably coupled to a waste intake conduit located exterior to the container.

G51. The method of any one of embodiments G48 to G50, wherein the waste intake conduit comprises a first end located at a waste source and a second end operably coupled to the input port of the waste pump.

G52. The method of any one of embodiments G48 to G51, wherein the waste pump or the waste intake system is configured to transport waste from a waste source to the media bed, or from the waste source to the interior of the container.

G53. The method of any one of embodiments G48 to G49, wherein the pump is operably coupled to a return conduit having a first end operably coupled to the output port of the waste pump and a second end located at a waste source.

G54. The method of any one of embodiments G48 to G53, wherein the second end of the return conduit comprises an opening.

G55. The method of any one of embodiments G48 to G53, wherein the return conduit comprises one or more fittings, valves, regulators, or gauges.

G56. The method of any one of embodiments G48 to G55, wherein the waste intake system comprises the intake conduit, the return conduit and optionally, one or more fittings, adaptors, valves, regulators or gauges.

G57. The method of any one of embodiments G26 to G37, wherein the container comprises the treated waste outlet.

G58. The method of embodiment G57, wherein the treated waste outlet comprises a bulkhead operably integrated into a sidewall of the container.

G59. The method of any one of embodiments G26 to G58, wherein the treated waste outlet is operably coupled to one or more treated waste outlet conduits located in the interior of the container.

G59.1. The method of embodiment G58 or G59, wherein the bulkhead comprises an interior side located inside the container, and an exterior side located outside the container, and the interior side of the bulkhead is operably coupled to the one or more treated waste outlet conduits.

G60. The method of embodiment G59, wherein the one or more treated waste outlet conduits comprise pipes or tubes.

G61. The method of any one of embodiments G26 to G60, wherein the one or more treated waste outlet conduits have an inside diameter of at least 1 cm, or in a range of 1 cm to about 1 meter.

G62. The method of any one of embodiments G33 to G61, wherein the one or more treated waste outlet conduits comprise one or more valves.

G63. The method of any one of embodiments G33 to G62, wherein the one or more waste outlet conduits comprise a manifold comprising a plurality of perforations or holes.

G64. The method of any one of embodiments G33 to G63, wherein at least one of the one or more treated waste outlet conduits is an overflow drain comprising a first end comprising an opening, wherein the opening has an inside diameter of at least 1 cm, or in a range of 1 cm to about 1 meter.

G65. The method of any one of embodiments G33 to G64, wherein the one or more treated waste outlet conduits comprise one or more fittings selected from T-fittings, elbows, adapters, and clamps.

G66. The method of any one of embodiments G33 to G65, wherein the one or more treated waste outlet conduits comprise one or more regulators or gauges.

G67. The method of any one of embodiments G1 to G66, wherein the media bed comprises a water inlet configured for introducing water into the container.

G68. The method of any one of embodiments G1 to G67, wherein the treated waste outlet is operably coupled to a treated waste return conduit.

G69. The method of any one of embodiments G1 to G68, wherein the treated waste return conduit comprises a waste return pump.

G70. The method of any one of embodiments G1 to G69, wherein the treated waste return conduit comprises one or more fittings, adaptors, valves, regulators or gauges.

G71. The method of any one of embodiments G1 to G70, wherein the treated waste return comprises an open end operably coupled to a waste source.

G71.1. The method of any one of embodiments G1 to G71, further comprising a homogenizer, blender, grinder or blender pump.

G71.2. The method of any one of embodiments G1 to G71.1, wherein the treated waste return is operably coupled to a discharge conduit terminating with an open end, optionally coupled to a valve configured for discharge of treated waste into an external environment.

G71.3. The method of any one of embodiments G1 to G71, wherein the treated waste return comprises a stand pipe operably coupled to, or terminating in a waste source.

G72. The method of any one of embodiments G1 to G72, wherein the waste source comprises a fish tank, a separating tank, a mixing tank, a holding tank, a bioreactor or a sump tank.

G73. The method of any one of embodiments G1 to G72, wherein the media bed or the container has a depth of about 6 inches to about 10 feet.

G74. The method of any one of embodiments G1 to G73, wherein the media bed or the container has a depth of about one foot to about four feet.

G75. The method of any one of embodiments G1 to G74, wherein the biomass, or a combination of the biomass and the media, has a depth of about 6 inches to about 10 feet.

G76. The method of any one of embodiments G1 to G75, wherein the biomass, or a combination of the biomass and the media, has a depth of about one foot to about four feet.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments, unless expressly stated otherwise. The illustrative examples provided herein are not intended to be exhaustive or to limit the claimed subject matter to the precise forms disclosed.

All numbers expressing quantities of ingredients and/or reaction conditions are to be understood as being modified in all instances by the term "about", unless otherwise indicated.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

What is claimed is:

1. An apparatus comprising a media bed configured for remediation of waste comprising:
    a substantially water tight container comprising a biomass held by the container, wherein the biomass comprises water and a genus of viable terrestrial worms that survive, eat, and reproduce at a density of about 1000 worms/m$^3$ to about 100,000 worms/m$^3$ in the container while completely and constantly submerged in the water;
    a waste inlet configured to introduce waste into the container;
    a treated waste outlet configured to extract treated waste from the container; and
    an aeration means configured to introduce air or oxygen into the biomass such that a dissolved oxygen content of the water is maintained at a level of at least 4 ppm.

2. The apparatus of claim 1, wherein the biomass held by the container consists of a fully aquatic environment.

3. The apparatus of claim 1, wherein the terrestrial worms comprise a species selected from the group consisting of *Eisenia fetida, Eisenia andrei, Lumbricus rubellus*, and *Lumbricus terrestris*.

4. The apparatus of claim 1, wherein the water further comprises un-ionized ammonia at an amount of 5 ppm or less.

5. The apparatus of claim 1, wherein the biomass or water comprises oxidizable waste.

6. The apparatus of claim 1, wherein the media bed further comprises media held by the container, wherein the media comprises aggregates, fibers or particles that are completely and constantly submerged in the water.

7. The apparatus of claim 1, wherein the water comprises an oxygen content of at least 5 ppm.

8. The apparatus of claim 1, wherein the water comprises an oxygen content in a range of about 5 ppm to about 15 ppm.

9. The apparatus of claim 1, wherein the media bed further comprises one or more plants.

10. The apparatus of claim 1, wherein the biomass is at least 70% (vol/vol) water.

11. The apparatus of claim 1, wherein the biomass further comprises one or more microbes of a genus selected from the group consisting of *Nitrosomonas, Nitrosospira, Nitrosococcus, Nitrosolobus, Nitrosopumilus, Nitrososphaera, Nitrobacter, Nitrospina*, and *Nitrococcus*.

12. The apparatus of claim 1, wherein the water is freshwater comprising a salinity of less than about 7 parts per thousand (ppt).

13. The apparatus of claim 1, wherein the biomass has a depth of at least 40 cm.

14. The apparatus of claim 1, wherein the biomass is configured to maintain a carbon:nitrogen (C:N) ratio of 8:1 to 27:1.

15. The apparatus of claim 1, wherein the apparatus further comprises a treated waste conduit operably coupled to the treated waste outlet, wherein (i) the treated waste conduit comprises a manifold comprising a plurality of perforations or holes, and (ii) the treated waste conduit is located in an interior of the container.

16. An apparatus comprising a media bed configured for remediation of waste comprising:

a substantially water tight container comprising a biomass held by the container, wherein the biomass comprises:

water and a genus of viable terrestrial worms that survive, eat, and reproduce at a density of about 1000 worms/m$^3$ to about 100,000 worms/m$^3$ in the container while completely and constantly submerged in the water, wherein said genus of viable terrestrial worms comprises one or more species selected from the group consisting of *Eisenia fetida, Eisenia andrei, Lumbricus rubellus*, and *Lumbricus terrestris;* microbes of the genus *Nitrosomonas* and microbes of the genus *Nitrobacter;* a waste inlet configured to introduce aqueous waste into the container;

a treated waste outlet configured to extract treated waste from the container; and an aeration means configured to introduce air or oxygen into the biomass such that a dissolved oxygen content of the water is maintained at a level of at least 4 ppm;

wherein the biomass held by the container comprises a fully aquatic environment.

17. The apparatus of claim 16, wherein the biomass has a depth of at least 40 cm and the biomass is at least 70% (vol/vol) water.

18. The apparatus of claim 17, wherein the water further comprises un-ionized ammonia at an amount of 5 ppm or less, and the biomass is configured to maintain a carbon:nitrogen (C:N) ratio of 8:1 to 27:1.

19. The apparatus of claim 18, wherein the media bed further comprises media held by the container, wherein the media comprises aggregates, fibers or particles, such that the media is completely and constantly submerged in the water.

20. The apparatus of claim 19, wherein the apparatus further comprises a treated waste conduit operably coupled to the treated waste outlet, wherein (i) the treated waste conduit comprises a manifold comprising a plurality of perforations or holes, and (ii) the treated waste conduit is located in an interior of the container.

\* \* \* \* \*